(12) United States Patent
Han et al.

(10) Patent No.: US 8,005,137 B2
(45) Date of Patent: Aug. 23, 2011

(54) VIDEO CODING AND DECODING METHOD USING WEIGHTED PREDICTION AND APPARATUS FOR THE SAME

(75) Inventors: Woo-jin Han, Suwon-si (KR); Kyo-hyuk Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1412 days.

(21) Appl. No.: 11/388,149

(22) Filed: Mar. 24, 2006

(65) Prior Publication Data

US 2006/0215762 A1 Sep. 28, 2006

Related U.S. Application Data

(60) Provisional application No. 60/664,961, filed on Mar. 25, 2005.

(30) Foreign Application Priority Data

May 13, 2005 (KR) .................. 10-2005-0040236

(51) Int. Cl.
*H04B 1/66* (2006.01)
(52) U.S. Cl. ........................................ 375/240
(58) Field of Classification Search .............. 375/240, 375/240.06, 240.13, 240.16, 240.14
See application file for complete search history.

(56) References Cited

U.S. PATENT DOCUMENTS

| | | | | |
|---|---|---|---|---|
| 6,081,551 | A * | 6/2000 | Etoh | 375/240 |
| 6,141,379 | A | 10/2000 | Sugiyama | |
| 6,381,275 | B1 * | 4/2002 | Fukuhara et al. | 375/240.06 |
| 6,788,740 | B1 * | 9/2004 | van der Schaar et al. | 375/240 |
| 2002/0090138 | A1 * | 7/2002 | Hamanaka | 382/239 |
| 2003/0156638 | A1 * | 8/2003 | Van Der Schaar | 375/240.1 |
| 2004/0086043 | A1 | 5/2004 | Ito et al. | |
| 2004/0246373 | A1 * | 12/2004 | Kadono et al. | 348/384.1 |
| 2005/0195896 | A1 * | 9/2005 | Huang et al. | 375/240.03 |
| 2005/0207496 | A1 * | 9/2005 | Komiya et al. | 375/240.16 |
| 2005/0220192 | A1 * | 10/2005 | Huang et al. | 375/240.16 |
| 2005/0259736 | A1 * | 11/2005 | Payson | 375/240.16 |

FOREIGN PATENT DOCUMENTS

| | | |
|---|---|---|
| JP | 9-84025 A | 3/1997 |
| KR | WO 2004-047977 A | 5/2004 |
| KR | 10-2004-0047977 A | 6/2004 |
| KR | 10-2004-0095399 A | 11/2004 |

(Continued)

OTHER PUBLICATIONS

Schwarz et al. "Joint Scalable Video Model JSVM-2", ISO/IEC JTC1/SC29/WG11 and ITU-T SG16 Q.6, JVT-O202. 15th Meeting, 2005, p. 1-31.

(Continued)

*Primary Examiner* — David C. Payne
*Assistant Examiner* — Leon-Viet Q Nguyen
(74) *Attorney, Agent, or Firm* — Sughrue Mion, PLLC

(57) ABSTRACT

A video coding and decoding method using a weighted prediction and an apparatus for the same are provided. The video coding method includes generating a predicted image for a present block; generating a weighted prediction factor which is a scaling factor of the predicted image that minimizes the difference between the present block and the predicted image; generating a weighted prediction image by multiplying the predicted image by the weighted prediction factor; and coding a residual signal generated by subtracting the weighted prediction image from the present block.

45 Claims, 14 Drawing Sheets

FOREIGN PATENT DOCUMENTS

| | | |
|---|---|---|
| RU | 2162280 C2 | 10/1994 |
| WO | WO 03-036981 | 5/2003 |
| WO | WO 03/075518 A1 | 9/2003 |
| WO | WO 2004/008642 A | 1/2004 |

OTHER PUBLICATIONS

Schwarz et al. "SNR-scalable extension of H.264/AVC" ISO/IEC JTC/SC29/WG11 and ITU-T SG16 Q.6, JVT-O35. 10$^{th}$ Meeting, 2003, p. 3113-3116.

Richardson "Video Coding H.264 and MPEG-4—New Generation Standards." Technosfera, Moscow, 2003, pp. 230-235.

Office Action dated Nov. 24, 2010, issued in Japanese Application No. 2008-502915.

Haruhisa Kato, "A Study on Fast Weighting Factor Determination for H.264/MEG-4 AVC Weighted Prediction", Information Technology Letters, vol. 3, Aug. 20, 2004, pp. 229-232.

Mikio Takagi, "Handbook of Image Analysis [Revised Edition]," University of Tokyo Press, Sep. 10, 2004, pp. 1460-1468 and 1493-1498.

Communication dated May 9, 2011 issued by the European Patent Office in counterpart European Patent Application No. 06716510.0.

Shen, Y. et., al. "Adaptive Weighted Prediction in Video Coding", IEEE International Conference on Multimedia and Expo (ICME), Jun. 27, 2004, pp. 427-430.

Kato, H. et., al. "Weighting Factor Determination Algorithm for H.264/MPEG-4 AVC Weighted Prediction", IEEE 6th Workshop on Multimedia Signal Processing, Sep. 29, 2004, pp. 27-30.

Flierl, M et., al. "Rate-Constrained Multihypothesis Prediction for Motion-Compensated Video Compression" IEEE Transactions on Circuits and Systems for Video Technology, vol. 12, No. 11, Nov. 1, 2002, pp. 957-969.

Tubaro, S. et., al. "A two layers video coding scheme for ATM networks", Signal Processing: Image Communications, Elsevier Science Publishers B.V., Jun. 1, 1991, pp. 129-141.

\* cited by examiner

VIDEO CODING AND DECODING METHOD USING WEIGHTED PREDICTION AND APPARATUS FOR THE SAME

CROSS-REFERENCE TO RELATED APPLICATIONS

This application claims priority from Korean Patent Application No. 10-2005-0040236 filed on May 13, 2005 in the Korean Intellectual Property Office, and U.S. Provisional Patent Application No. 60/664,961 filed on Mar. 25, 2005 in the United States Patent and Trademark Office, the disclosures of which are incorporated herein by reference in their entirety.

BACKGROUND OF THE INVENTION

1. Field of the Invention

Methods and apparatuses consistent with the present invention relate to video coding and decoding using a weighted prediction, and more particularly, to video coding and decoding using a weighted prediction which can reduce the amount of residual signal by generating a weighted prediction image by multiplying a predicted image of a present block by a specified scaling factor and by coding a residual signal obtained by subtracting the weighted prediction image from the present block.

2. Description of the Prior Art

With the development of information and communication technologies, multimedia communications are increasing in addition to text and voice communications. The existing text-centered communication systems do not satisfy the diverse desires of consumers, and thus multimedia services that can accommodate diverse forms of information such as text, images, music, and others are increasing. Since multimedia data is large, mass storage media and wide bandwidths are respectively required for storing and transmitting the multimedia data. Accordingly, compression coding techniques are required to transmit the multimedia data, which includes text, images and audio data.

The basic principle of data compression is to remove data redundancy. Data can be compressed by removing spatial redundancy such as a repetition of the same color or object in images, temporal redundancy such as little change of adjacent frames in moving image frames or continuous repetition of sounds in audio, and visual/perceptual redundancy, which considers the human insensitivity to high frequencies. In a general video coding method, the temporal redundancy is removed by temporal filtering based on motion compensation, and the spatial redundancy is removed by a spatial transform.

FIG. 1 is a view illustrating a prediction in a conventional video coding method.

Existing video codecs, such as MPEG-4 and H.264 codecs, raise the compression efficiency by removing the similarity between adjacent frames on the basis of motion compensation. Generally, a prediction of a similar image in a reference frame temporally preceding the present frame 110 is called a forward prediction 120, and a prediction of a similar image in a reference frame temporally following the present frame is called a backward prediction 130. A temporal prediction using both a forward reference frame and a backward reference frame is called a bidirectional prediction 140.

The existing single layer video codecs can improve their efficiency by selecting and coding using an optimum mode among various modes, as described above. On the other hand, multilayer video codecs, such as the H.264 scalable extension (or MPEG scalable video coding), use another prediction method, i.e., a base layer prediction method 150, in order to remove the similarity between layers. That is, the video codecs perform an image prediction using an image in a frame that is in the same temporal position as a block to be presently coded in a base layer image. In this case, if respective layers have different resolutions, the video codec performs the temporal prediction after up-sampling the base layer image and matching the resolution of the base layer image to the resolution of the present layer.

Although several reasons may exist for selecting a prediction mode, direct coding may be performed with respect to the respective prediction methods to select a method that is has a lower cost. The cost C may be defined in various ways, and the representative cost is calculated as in Equation (1) on the basis of a rate-distortion. Here, E denotes the difference between the original signal and the signal restored by decoding coded bits, and B denotes the number of bits required for performing the respective methods. Also, $\lambda$ denotes a Lagrangian coefficient that can adjust a reflection rate of E and B.

$$C = E + \lambda B \quad (1)$$

Conventional video coding methods using temporal prediction are disclosed in many patent documents. For instance, Korean Patent Unexamined Publication No. 2004-047977 discloses a spatially scalable compression, and particularly a video coding method that includes calculating motion vectors for respective frames, based on the sum of an up-scaled base layer and an enhancement layer.

However, with the exception of the base layer prediction, the conventional video coding methods have the problem that they never use the large amount of information of the base layer.

SUMMARY OF THE INVENTION

The present invention provides a video coding and decoding method using a weighted prediction and an apparatus for the same that can raise the efficiency of video coding by reducing an error of the present block to be compressed and a predicted image.

The present invention also provides a video coding and decoding method using a weighted prediction and an apparatus for the same that can raise the efficiency of video coding by using information of a base layer in generating a prediction image.

According to an aspect of the present invention, there is provided a video coding method which includes the generating a predicted image for a present block; generating a weighted prediction factor which is a scaling factor of the predicted image that minimizes a difference between the present block and the predicted image; generating a weighted prediction image by multiplying the predicted image by the weighted prediction factor; and coding a residual signal generated by subtracting the weighted prediction image from the present block.

According to another aspect of the present invention, there is provided a multilayer video coding method, which includes the generating a predicted image for a present block; generating a weighted prediction factor which is a scaling factor of the predicted image that minimizes a difference between the present block and the predicted image; generating a weighted prediction image by multiplying the predicted image by the weighted prediction factor; selecting an image that raises a compression performance of the present block between the predicted image and the weighted prediction image; coding a residual signal generated by subtracting the selected image from the present block; and inserting information that indicates whether to use a weighted prediction image into the present block according to the result of selection.

According to still another aspect of the present invention, there is provided a multilayer video decoding method, which includes the steps of restoring a residual signal of a present block to be restored from a bit stream; restoring a predicted image of the present block from the bit stream; generating a weighted predication image by multiplying the predicted image by a weighted prediction factor; and restoring the present block by adding the residual signal to the weighted prediction image; wherein the weighted prediction factor is a scaling factor of the predicted image that minimizes a difference between the present block and the predicted image.

According to still another aspect of the present invention, there is provided a multimedia video encoder, which includes means for generating a predicted image for a present block; means for generating a weighted prediction factor which is a scaling factor of the predicted image that minimizes a difference between the present block and the predicted image; means for generating a weighted prediction image by multiplying the predicted image by the weighted prediction factor; and means for coding a residual signal generated by subtracting the weighted prediction image from the present block.

According to still another aspect of the present invention, there is provided a multilayer video encoder, which includes means for generating a predicted image for a present block; means for generating a weighted prediction factor which is a scaling factor of the predicted image that minimizes a difference between the present block and the predicted image; means for generating a weighted prediction image by multiplying the predicted image by the weighted prediction factor; means for selecting an image that raises a compression performance of the present block between the predicted image and the weighted prediction image; and means for coding a residual signal generated by subtracting the selected image from the present block, and inserting information that indicates whether to use a weighted prediction image into the present block according to the result of selection.

According to still another aspect of the present invention, there is provided a multilayer video decoder, which includes means for restoring a residual signal of a present block to be restored from a bit stream; means for restoring a predicted image of the present block from the bit stream; means for generating a weighted predication image by multiplying the predicted image by a weighted prediction factor; and means for restoring the present block by adding the residual signal to the weighted prediction image; wherein the weighted prediction factor is a scaling factor of the predicted image that minimizes a difference between the present block and the predicted image.

BRIEF DESCRIPTION OF THE DRAWINGS

The above and other aspects of the present invention will be more apparent from the following detailed description of exemplary embodiments taken in conjunction with the accompanying drawings, in which.

DETAILED DESCRIPTION OF THE EXEMPLARY EMBODIMENTS

Figure 1:
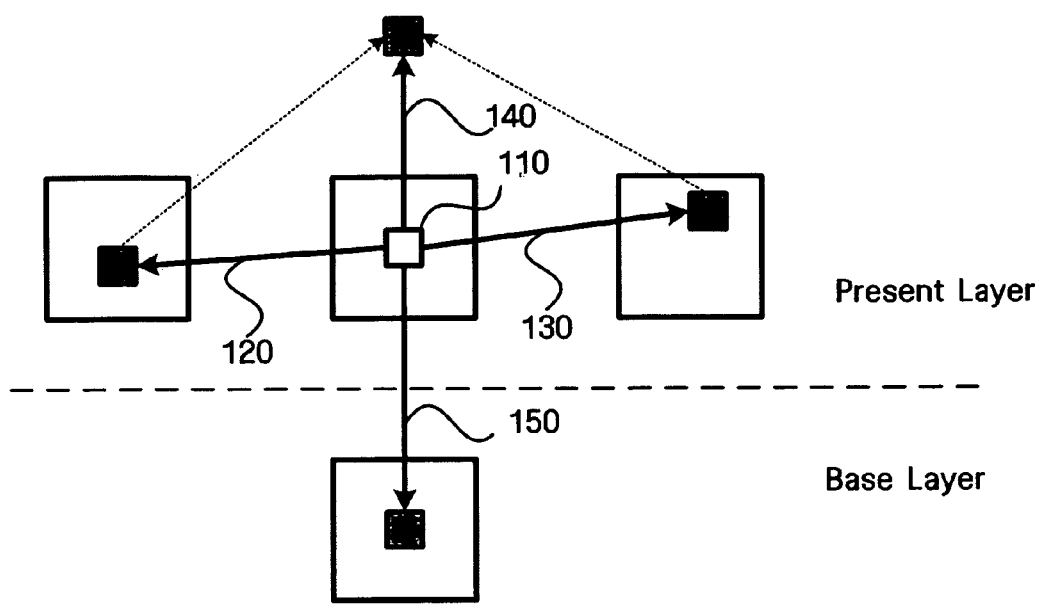
FIG. 1 is a view illustrating a prediction in a conventional video coding method.

Hereinafter, exemplary embodiments of the present invention will be described in detail with reference to the accompanying drawings. The aspects and features of the present invention and methods for achieving the aspects and features will become apparent by referring to the exemplary embodiments to be described in detail with reference to the accompanying drawings. However, the present invention is not limited to the exemplary embodiments disclosed hereinafter, but can be implemented in diverse forms. The matters defined in the description, such as the detailed construction and elements, are provided to assist those of ordinary skill in the art in a comprehensive understanding of the invention, and the present invention is only defined within the scope of the appended claims. In the whole description of the present invention, the same drawing reference numerals are used for the same elements across various figures.

In the following description, it is assumed that a block includes a macroblock and a subdivided unit of the macroblock, and all operations are performed in the unit of a block. Also, the image generated by the conventional temporal prediction method, as described above with reference to FIG. 1, is expressed as a predicted image. This definitions are provided to aid understanding of the invention, but the present invention is not limited by such definitions.

In the video coding according to exemplary embodiments of the present invention, a predicted image is not used as it is, but the present block is predicted by a multiplication of the predicted image by a scaling factor after the scaling factor, which is used to optimally predicting the present block to be compressed, is calculated. In the following description, for explanatory convenience, the prediction of the present block by multiplying the predicted image by the scaling factor is denoted as a weighted prediction, and a value obtained by multiplying the predicted image by the scaling factor is denoted as a weighted prediction image. Also, the scaling factor is denoted as a weighted prediction factor. These definitions are provided to aid understanding of the invention, and the present invention is not limited by such definitions.

A method of calculating a weighted prediction factor according to an exemplary embodiment of the present invention will now be explained.

It is assumed that pixel values of the present block are expressed as x(i, j), and pixel values of a predicted image are expressed as y(i, j). In the case of performing the prediction through the conventional method, as illustrated in FIG. 1, a mean squared error E between the present block and the predicted image is expressed as follows in Equation (2).

$$E = \sum \{x(i, j) - y(i, j)\}^2 \quad (2)$$

In the case of the prediction method according to an exemplary embodiment of the present invention, pixel values of a weighted prediction image $\alpha \times y(i, j)$, which is obtained by multiplying the pixel values of the predicted image y(i, j) by the weighted prediction factor $\alpha$, are used instead of the pixel values of the predicted image y(i, j), and thus the mean squared error E between the present block and the predicted image is expressed as follows in Equation (3).

$$E = \sum \{x(i, j) - \alpha y(i, j)\}^2 \quad (3)$$

In order to minimize the mean squared error E in Equation (3), Equation (4) is obtained by performing a partial differentiation of Equation (3) with respect to $\alpha$ and setting the result of the partial differentiation equal to zero.

$$\frac{\partial E}{\partial \alpha} = -2 \sum x(n) y(n) - 2\alpha \sum y(n)^2 = 0 \quad (4)$$

From Equation (4), $\alpha$ is obtained as follows in Equation (5).

$$\alpha = \frac{\sum x(i, j) y(i, j)}{\sum y(i, j)^2} \quad (5)$$

In Equation (5), x(i, j) and y(i, j) are in the form of a cross correlation. In the exemplary embodiment of the present invention, an encoder calculates $\alpha$ for each block in the present frame according to Equation (5), and transmits the calculated $\alpha$ to a decoder side. The decoder restores a weighted prediction image by multiplying a restored predicted image by the $\alpha$ received from the encoder, and restores the corresponding block by adding a restored residual signal to the weighted prediction image.

In another exemplary embodiment of the present invention, in order to calculate the weighted prediction factor $\alpha$, pixel values of a base layer image z(i, j) that is in the same temporal position as the present block is used instead of the pixel values of the original frame block x(i,j), and thus a separate transmission of $\alpha$ is not required. In this case, $\alpha$ is calculated using Equation (6).

$$\alpha = \frac{\sum z(i, j) y(i, j)}{\sum y(i, j)^2} \quad (6)$$

Figure 2:
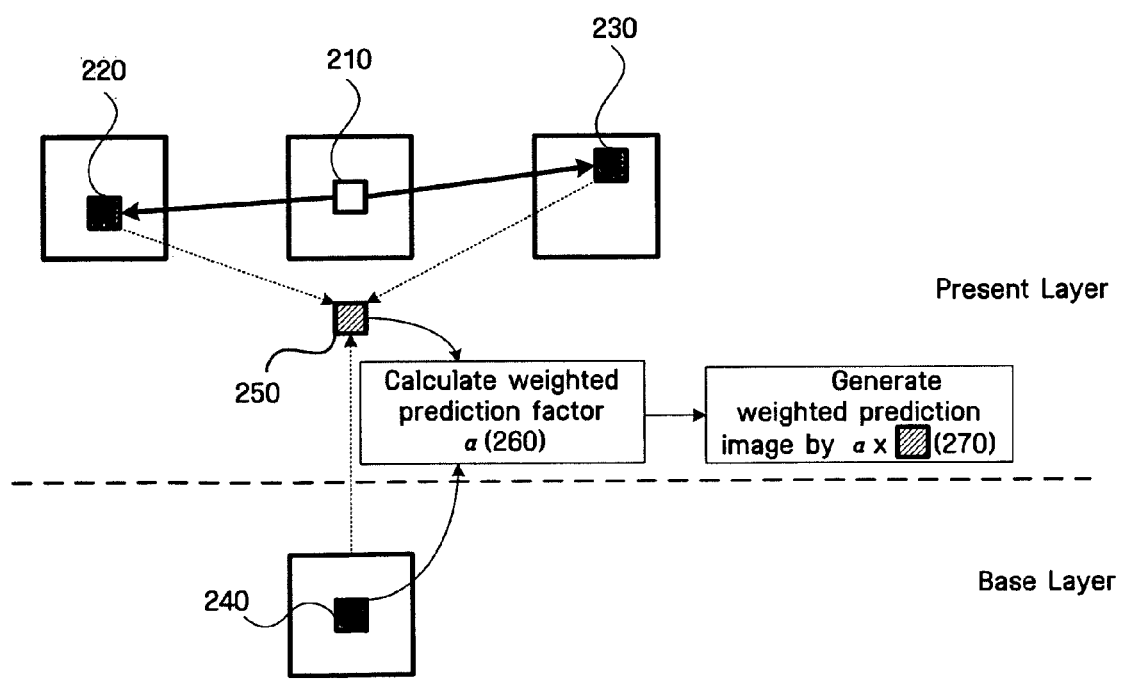
FIG. 2 is a view illustrating the concept of a weighted prediction according to an exemplary embodiment of the present invention.

If $\alpha$ is calculated using Equation (6), the decoder can recognize both the pixel values of the base layer image z(i, j) and the pixel values of the predicted image y(i, j), and thus it can recalculate a without separately receiving $\alpha$ from the encoder. FIG. 2 shows the concept of a weighted prediction according to an exemplary embodiment of the present invention.

The encoder generates a predicted image 250 with respect to the present block 210 of the present frame to be compressed by using at least one of a forward reference frame image 220 that exists in the same layer of the present frame, a backward reference frame image 230, and a base layer frame image 240. The encoder calculates $\alpha$ according to the exemplary embodiment of the present invention according to Equation (6) (260), and generates a weighted prediction image by multiplying the predicted image 250 by $\alpha$ (270). Then, the encoder obtains a residual signal by subtracting the weighted prediction image from the present block 210, and encodes the residual signal before transmitting the encoded residual signal to the decoder side.

In the case of a video codec that generates the pixel values of the predicted image y(i, j) from the values already restored through a quantization, i.e., a video codec that uses a closed loop, the video coding and decoding can be sufficiently performed only using the method as described above with reference to FIG. 2. However, in the case of a video codec that generates the pixel values of the predicted image y(i, j) corresponding to the values of the original frame that has not been quantized, i.e., a video codec that uses an open loop, the values of the predicted signal y(i, j) in the encoder side may be different from those in the decoder side, and this may cause the a calculated by the encoder to be quite different from the a recalculated by the decoder. In this case, the encoder and the decoder can perform video coding and decoding with the same $\alpha$ by using the base layer information instead of the predicted signal y(i, j) in Equation (6).

Figure 3:
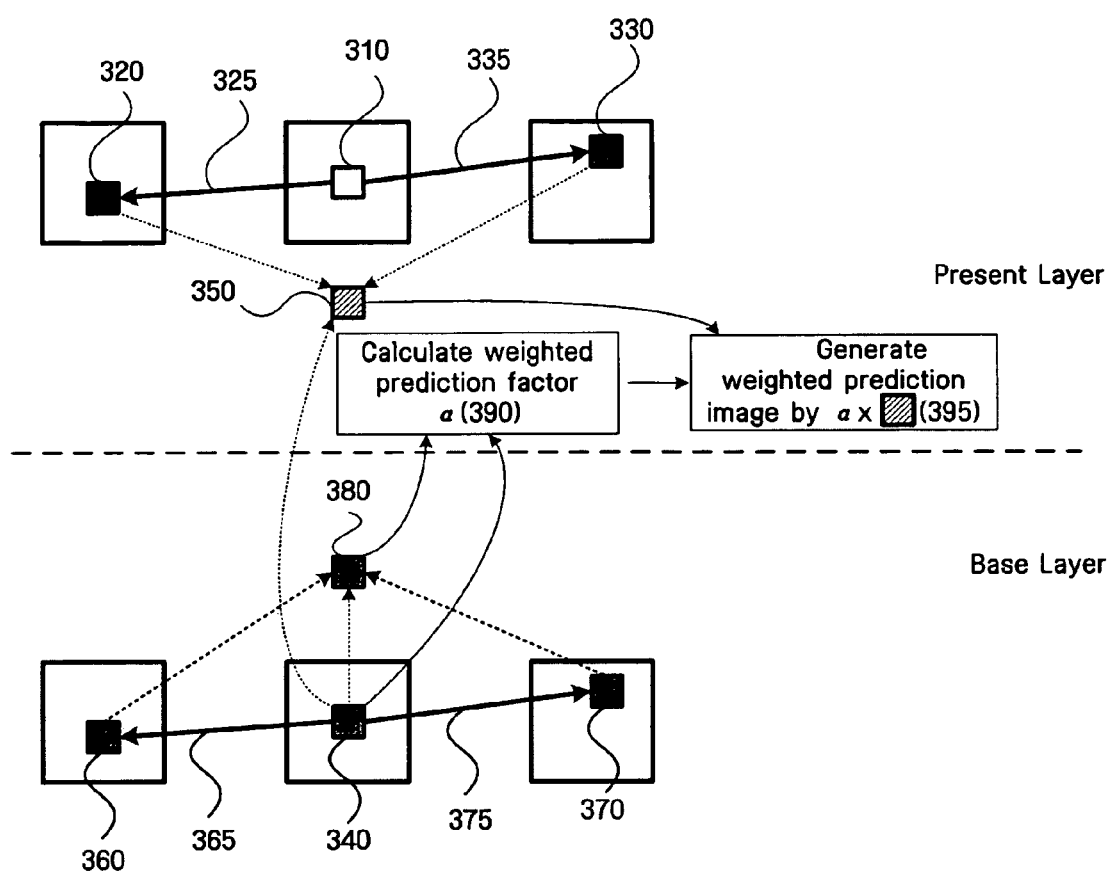
FIG. 3 is a view illustrating the concept of another weighted prediction according to an exemplary embodiment of the present invention.

FIG. 3 conceptually shows a process of calculating a weighted prediction factor $\alpha$ using the base layer information instead of the predicted signal y(i, j).

The encoder generates a predicted image 350 with respect to the present block 310 of the present frame to be compressed by using at least one of a forward reference frame image 320 that exists in the same layer as the present frame, a backward reference frame image 330, and a base layer frame image 340. The encoder calculates a weighted prediction factor $\alpha$ in the similar manner to that in Equation (6) (390). Here, pixel values y(i,j) of the predicted image 350 of the present block is replaced by pixel values u(i, j) of the base layer prediction image generated by the base layer information. The pixel values u(i, j) of the base layer prediction image are obtained as follows.

If the predicted image 350 is generated from at least one of the forward reference frame 320 or the backward reference frame 330 of the present layer, the encoder searches for base layer reference images 360 and 370, which are indicated by the same motion vectors 365 and 375 as motion vectors 325 and 335 of the present block, from the forward frame or the backward frame of the base layer image 340 that is in the same temporal position as the present block. At this time, if the predicted image 350 is generated from the base layer image 340, the encoder uses the pixel values of the base layer image 340 as the pixel values y(i,j) of the predicted image 350, or performs an up-sampling of the base layer image when the resolution of the base layer is lower than the resolution of the present layer. If the pixel values u(i, j) of the newly generated base layer prediction image 380 are used, the weighted prediction factor α according to an exemplary embodiment of the present invention are calculated as in Equation (7).

$$\alpha = \frac{\sum z(i, j)u(i, j)}{\sum u(i, j)^2} \quad (7)$$

The encoder generates the weighted prediction image by multiplying the predicted image 350 by α (395). Then, the encoder obtains the residual signal by subtracting the weighted prediction image from the present block 310, encodes the residual signal, and transmits the encoded residual signal to the decoder side.

The exemplary embodiments as described above with reference to FIGS. 2 and 3 are useful if the original frame of the present layer is similar to the base layer frame and if the quality of the base layer frame is above a predetermined level, but they are not useful if the quality of the base layer frame is greatly lowered, and thus the difference between the original frame and the base layer frame is great. In this case, the conventional prediction method may be selectively performed without using the weighted prediction factor. Particulars of such a selection will be explained later with reference to FIG. 10.

Figure 4:
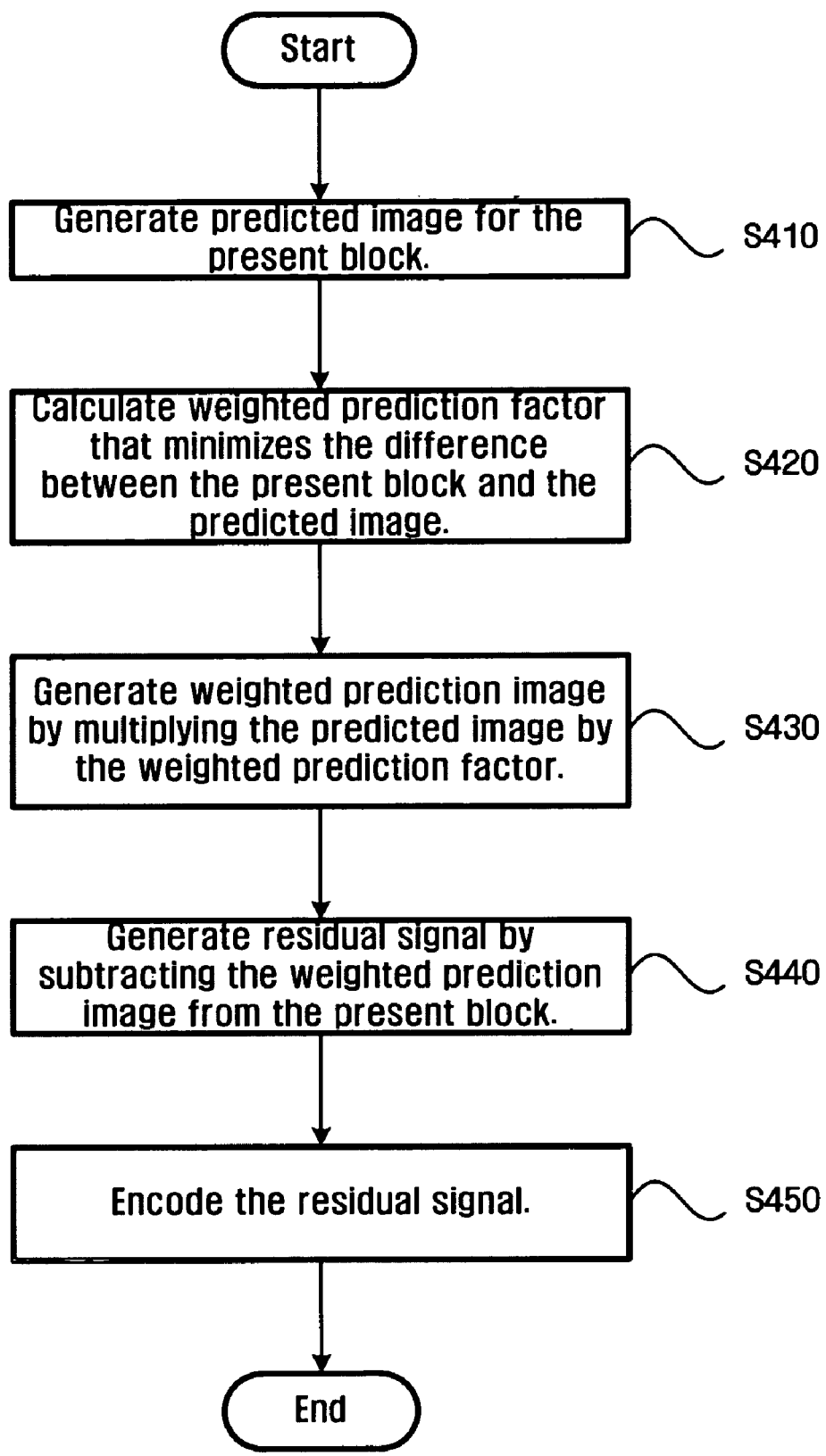
FIG. 4 is a flowchart illustrating a video coding process using a weighted prediction according to an exemplary embodiment of the present invention.

FIG. 4 is a flowchart illustrating a video coding process using a weighted prediction according to an exemplary embodiment of the present invention.

Referring to FIG. 4, the encoder generates the predicted image of the present block according to the conventional prediction method as described above with reference to FIG. 1 (S410). Then, the encoder calculates the weighted prediction factor, which is a scaling factor that minimizes the difference between the present block and the predicted image (S420), as in the exemplary embodiments expressed by Equations (5) to (7). The encoder generates the weighted prediction image for performing a more accurate prediction by multiplying the predicted image by the weighted prediction factor (S430), generates the residual signal by subtracting the weighted prediction image from the present block (S440), and then encodes the residual signal (S450).

Figure 5:
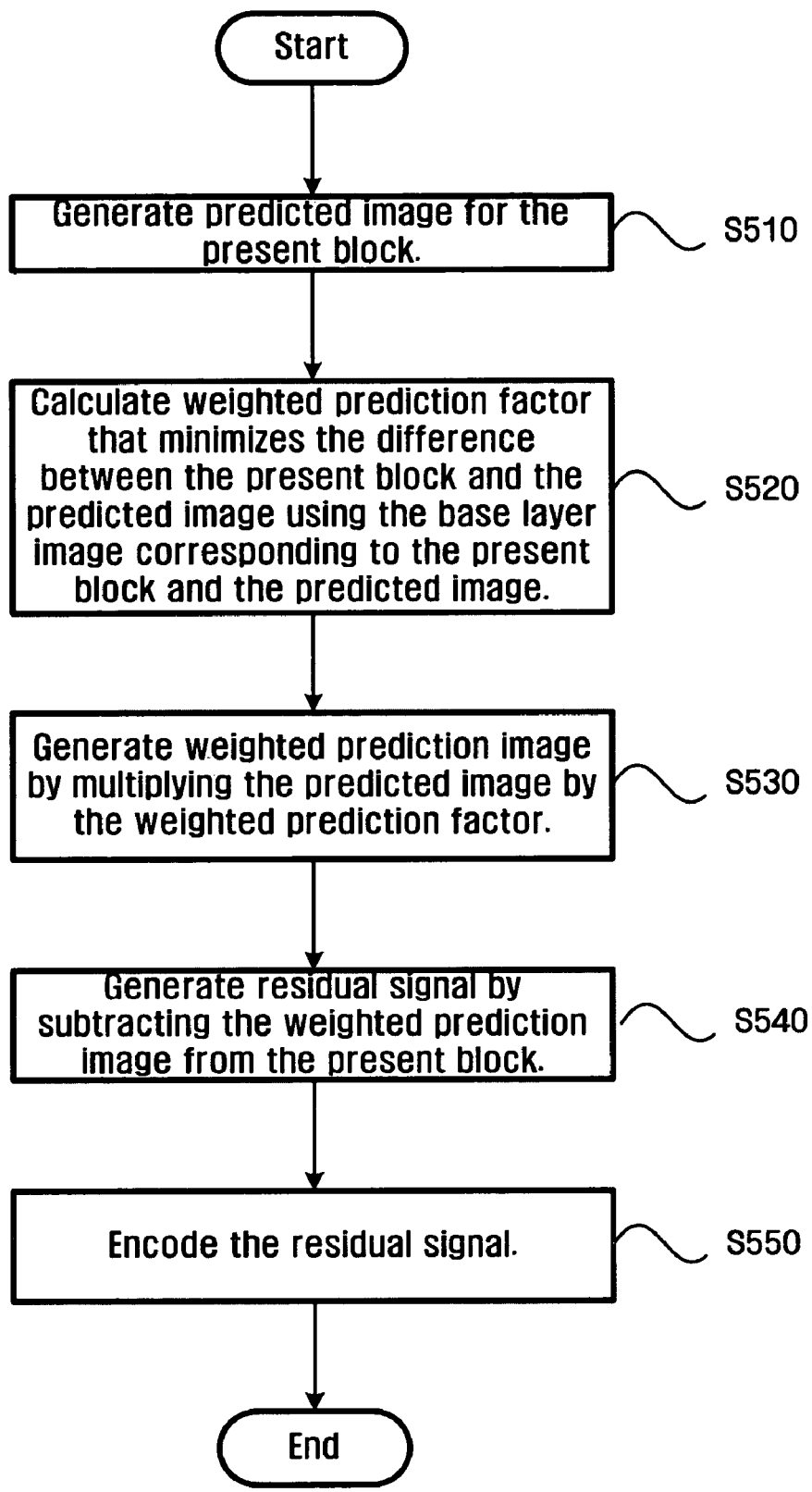
FIG. 5 is a flowchart illustrating a video coding process using a weighted prediction according to another exemplary embodiment of the present invention.

FIG. 5 is a flowchart illustrating a video coding process using a weighted prediction according to another exemplary embodiment of the present invention.

Referring to FIG. 5, in order to calculate the weighted prediction factor α, as described above with reference to FIG. 2, the pixel values z(i, j) of the base layer image that is in the same temporal position as the present block is used instead of the pixel values x(i, j) of the present block of the original frame, and thus a separate transmission of the weighted prediction factor α is not required. For this, the encoder according to the exemplary embodiment of the present invention generates the predicted image of the present block to be compressed according to the conventional prediction method as described above with reference to FIG. 1 (S510), and calculates the weighted prediction factor α using the pixel values z(i, j) of the corresponding image of the base layer frame that is in the same temporal position as the present frame and the pixel values y(i, j) of the predicted image (S520). In the exemplary embodiment of the present invention, an example of a method for calculating the weighted prediction factor α is expressed in Equation (6). The encoder generates the weighted prediction image for a more accurate prediction by multiplying the predicted image by the weighted prediction factor (S530), generates the residual signal by subtracting the weighted prediction image from the present block (S540), and then encodes the residual signal (S550).

Figure 6:
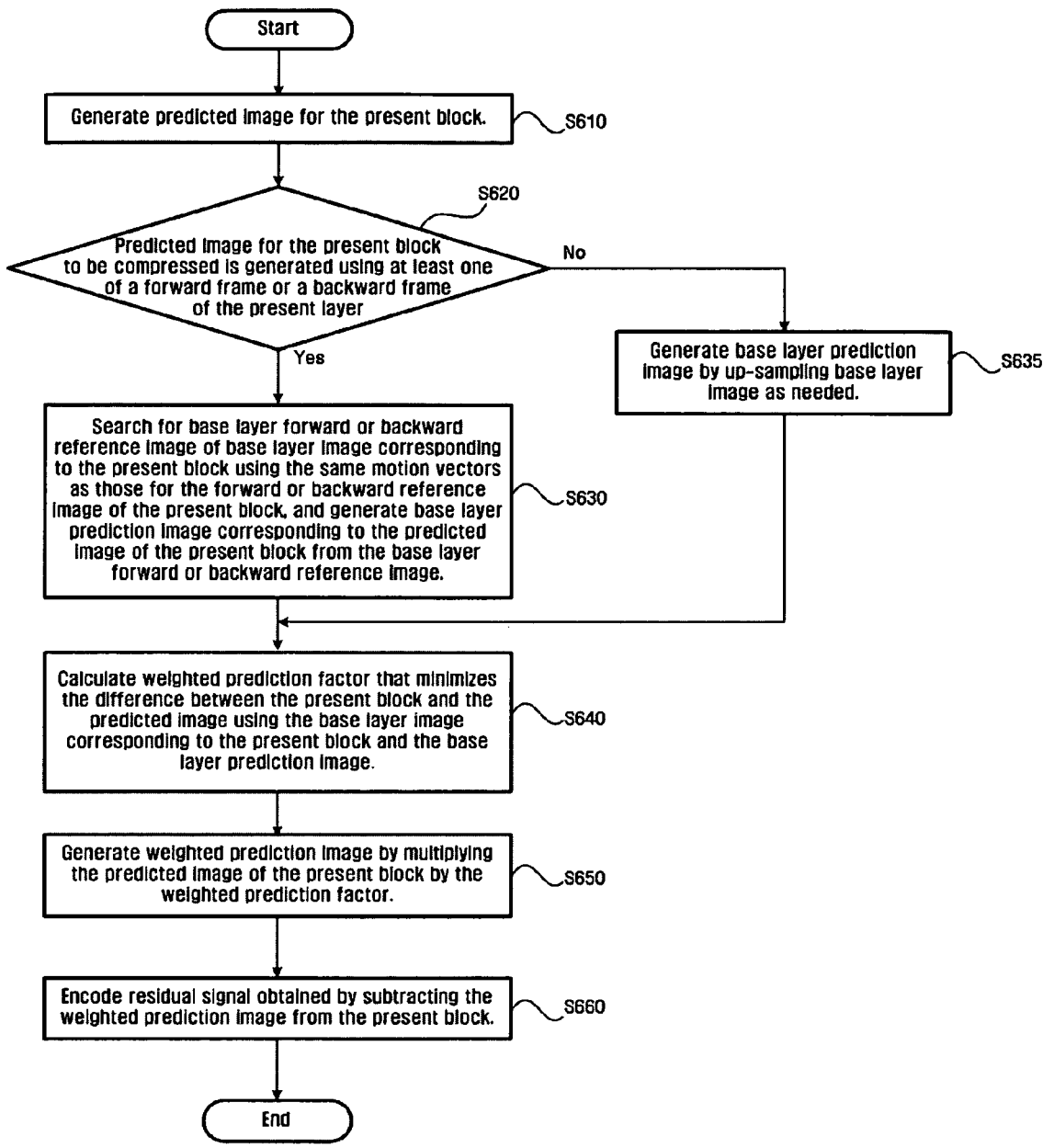
FIG. 6 is a flowchart illustrating a video coding process using a weighted prediction according to still another exemplary embodiment of the present invention.

FIG. 6 is a flowchart illustrating a video coding process using a weighted prediction according to still another exemplary embodiment of the present invention.

As described above with reference to FIG. 3, in the video codec, the value of the predicted signal y(i, j) in the encoder side becomes different from that in the decoder side due to the drift error, and thus if the video coding method as illustrated in FIG. 5 is used as it is, the weighted prediction factor α calculated in the decoder becomes different from that calculated in the encoder. Accordingly, an error occurs in the value of the video block restored by the decoder side. The video coding method according to the exemplary embodiment of the present invention performs the calculation of the weighted prediction factor α as follows.

The encoder generates the predicted image of the present block according to the conventional prediction method as described above with reference to FIG. 1 (S610). If the predicted image of the present block to be compressed is generated using at least one of a forward frame or a backward frame of the present layer ("yes" in S620), the encoder searches for an area, which is indicated by a motion vector that is the same as a motion vector of the present block, from the forward frame or the backward frame of the base layer image that is in the same temporal position as the present block, and generates the base layer prediction image using the same method as the method that generated the predicted image (S630). Then, the encoder calculates the weighted prediction factor α according to Equation (7) using the base layer image corresponding to the present block and the base layer prediction image (S640). By contrast, if the predicted image of the present block is generated from the base layer image ("no" in S620), the base layer image corresponding to the present block becomes the base layer prediction image, and the value of z(i, j) is used instead of u(i, j) in Equation (7) (S635).

The encoder generates the weighted prediction image for performing a more accurate prediction by multiplying the predicted image by the weighted prediction factor (S650), and then encodes the residual signal obtained by subtracting the weighted prediction image from the present block (S660).

Figure 7:
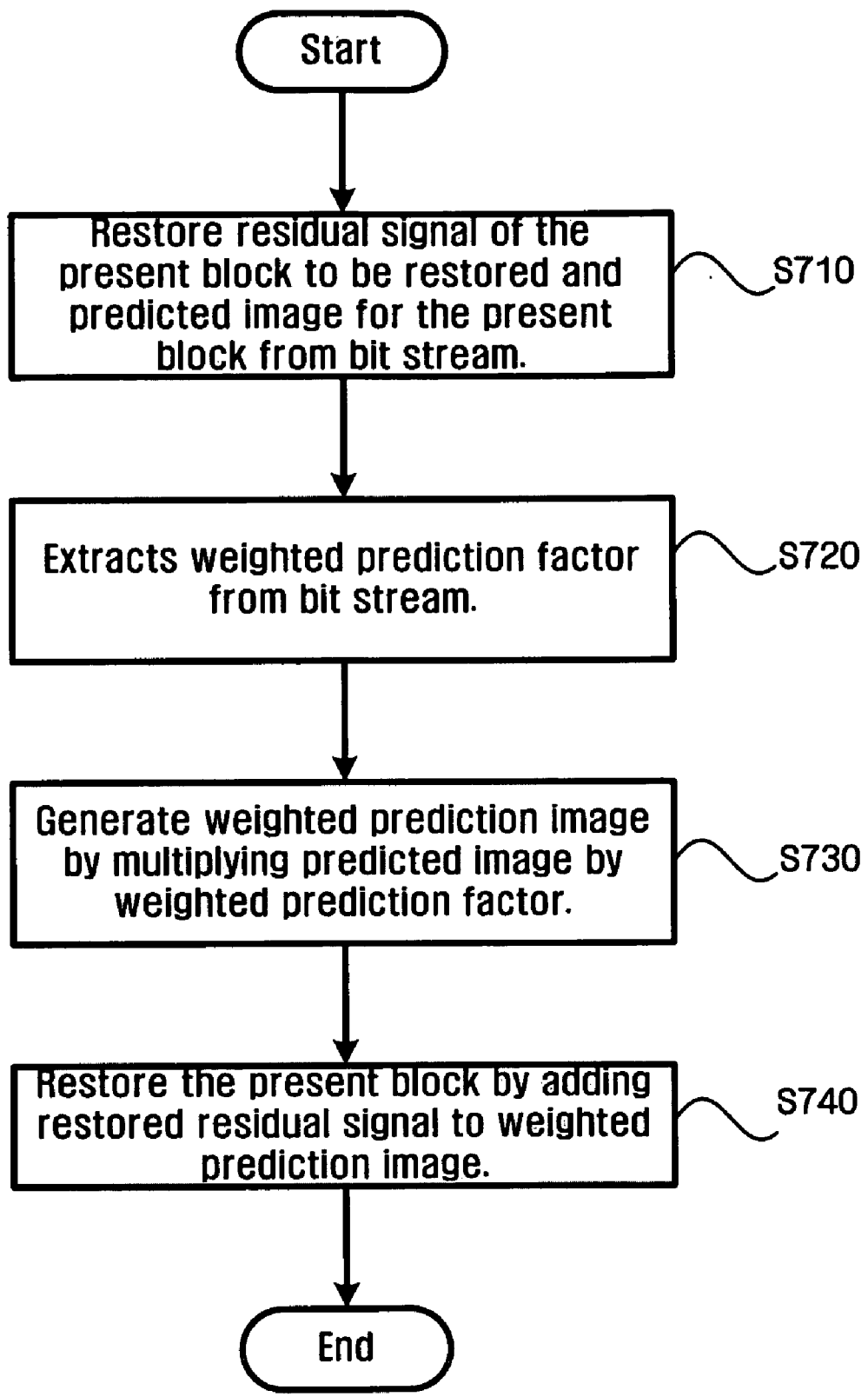
FIG. 7 is a flowchart illustrating a video decoding process according to an exemplary embodiment of the present invention.

FIG. 7 is a flowchart illustrating a video decoding process according to an exemplary embodiment of the present invention.

Referring to FIG. 7, the decoder according to this exemplary embodiment of the present invention restores the residual signal of the present block to be restored from the bit stream transmitted from the encoder and the predicted image of the present block (S710), and extracts the weighted prediction factor generated and transmitted by the encoder from the bit stream (S720). In the present exemplary embodiment of the present invention, the decoder can be used in the case where the encoder calculates the weighted prediction factor and inserts the weighted prediction factor into the bit stream to be transmitted. The decoder generates the weighted prediction image by multiplying the restored prediction image by the extracted weighted prediction factor (S730), and then restores the present block by adding the restored residual signal to the weighted prediction image (S740).

Figure 8:
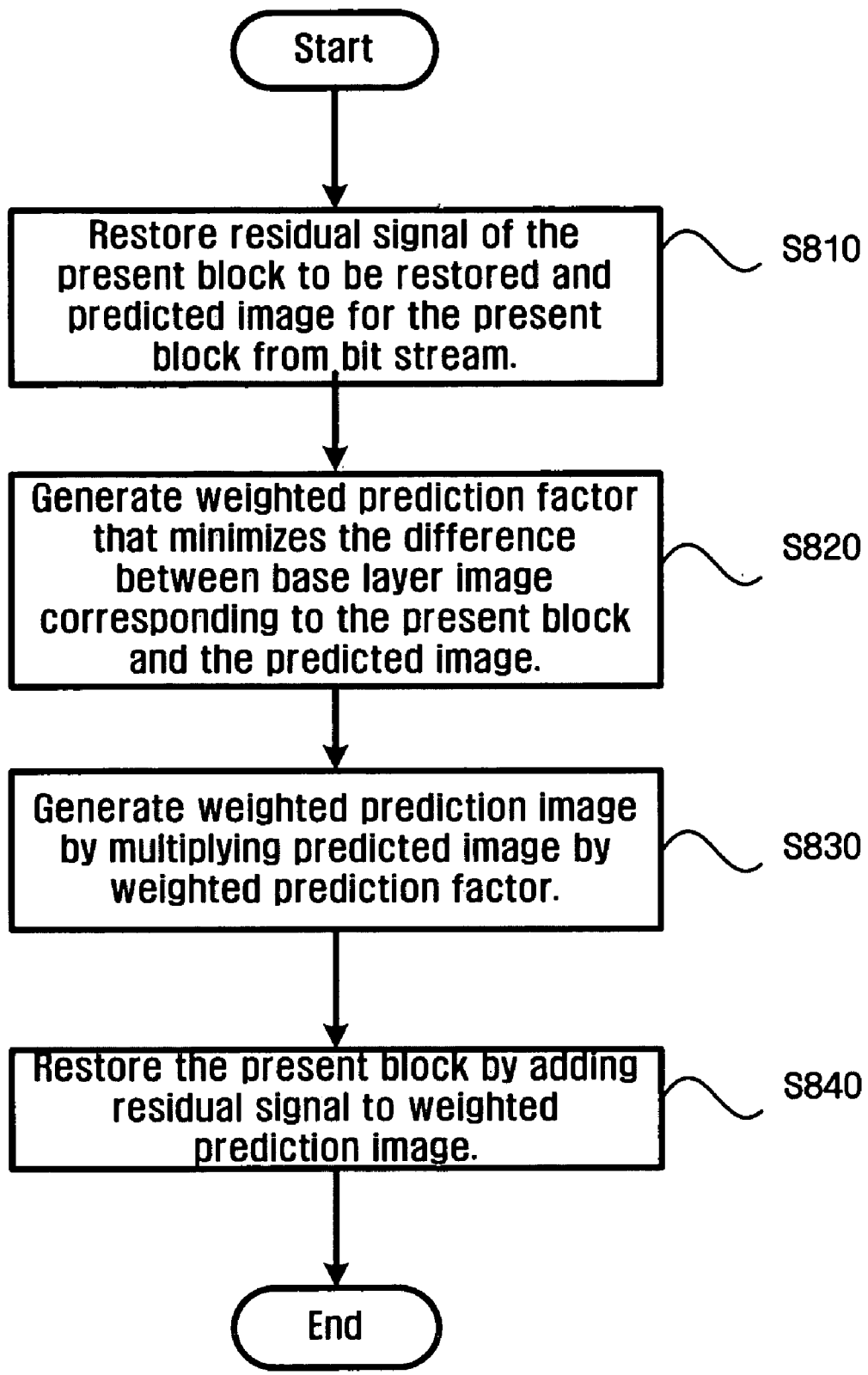
FIG. 8 is a flowchart illustrating a video decoding process that corresponds to the video coding process of FIG. 5.

FIG. 8 is a flowchart illustrating a video decoding process that corresponds to the video coding process of FIG. 5.

Referring to FIG. 8, the decoder according to this exemplary embodiment of the present invention restores the residual signal of the present block to be restored from the bit stream and the predicted image of the present block (S810). The decoder generates a weighted prediction factor that minimizes the difference between a corresponding image of the base layer frame, which is in the same temporal position as the present frame where the present block is positioned, and the restored prediction image (S820). At this time, the weighted prediction factor can be calculated according to Equation (6). The decoder generates the weighted prediction image by multiplying the restored prediction image by the weighted prediction factor (S830), and restores the present block by adding the restored residual signal to the weighted prediction image (S840).

Figure 9:
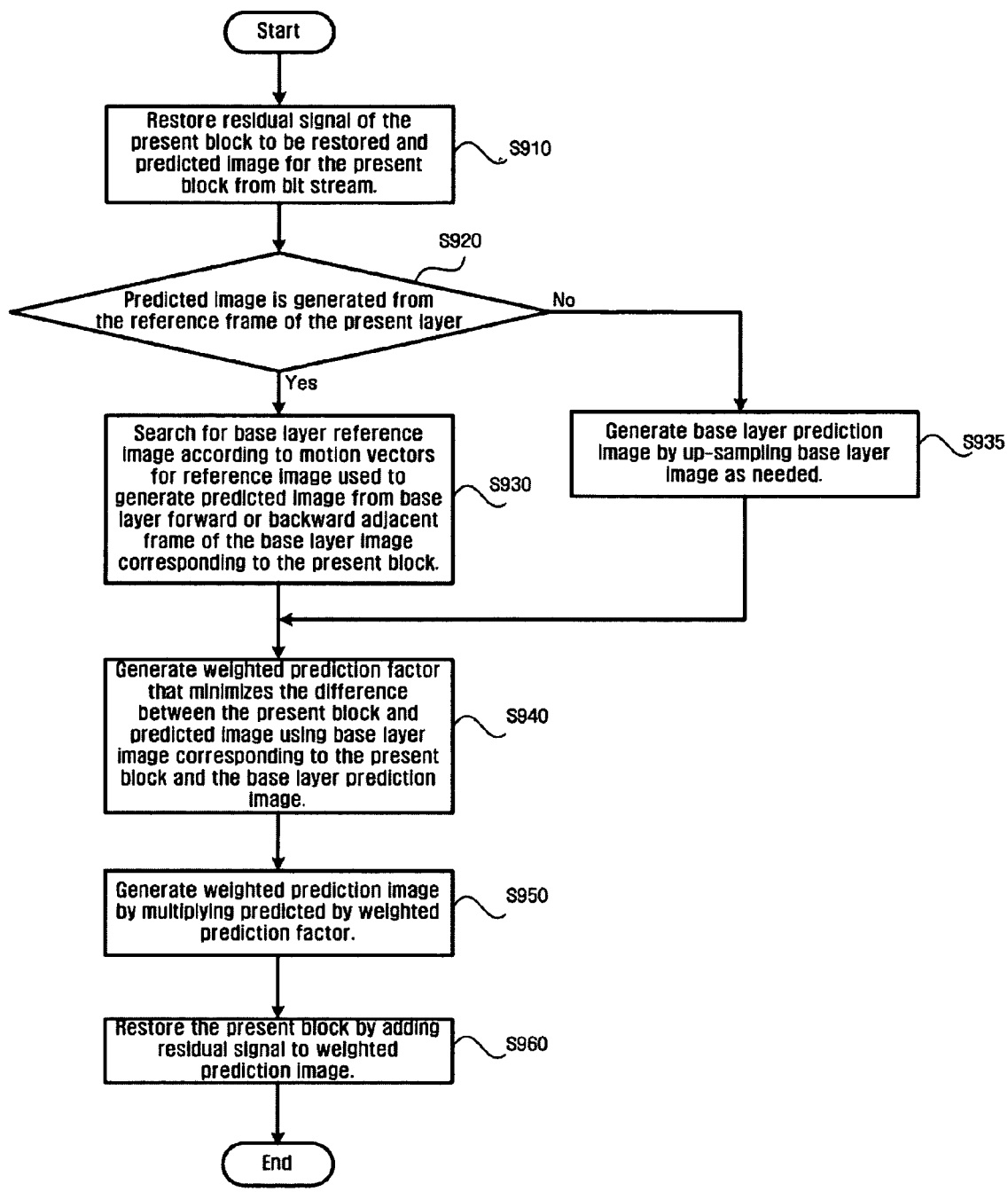
FIG. 9 is a flowchart illustrating a video decoding process that corresponds to the video coding process of FIG. 6.

FIG. 9 is a flowchart illustrating a video decoding process that corresponds to the video coding process of FIG. 6.

Referring to FIG. 9, the decoder according to this exemplary embodiment of the present invention restores the residual signal of the present block to be restored from the bit stream and the predicted image of the present block (S910). If the predicted image is generated from the reference frame of the present layer ("yes" in S920), the decoder searches for the base layer reference image from the forward frame or the backward frame of the base layer image that corresponds to the present block by using motion vectors of the present block as they are, and generates the base layer prediction image in the same manner as the method of generating the predicted image of the present block by using the searched base layer reference image (S930). On the other hand, if the predicted image is not generated from the base layer frame ("no" in S920), the decoder generates the base layer prediction image by using the base layer image of the present block as it is or by up-sampling the base layer image (S935). Then, the decoder generates the weighted prediction factor that minimizes the difference between the present block and the predicted image by using the base layer image corresponding to the present block and the base layer prediction image (S940). That is, the decoder calculates the weighted prediction factor by using the pixel value of the base layer image z(i, j) and the pixel values of the base layer prediction image u(i, j) according to Equation (7) as described above. The decoder generates the weighted prediction image by multiplying the restored prediction image by the weighted prediction factor (S950), and restores the present block by adding the restored residual signal to the weighted prediction image (S960).

Figure 10:
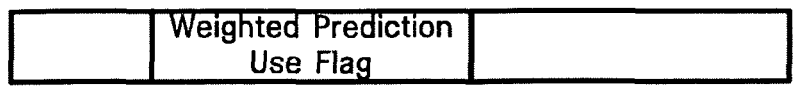
FIG. 10 is a view illustrating a data structure for selectively performing the conventional prediction and a weighted prediction according to an exemplary embodiment of the present invention.

FIG. 10 is a view illustrating a data structure for selectively performing the conventional prediction and a weighted prediction according to an exemplary embodiment of the present invention.

The above-described method is effective in the case where there is not a significant difference between the base layer frame and the present frame, and the prediction is not performed well through the existing method. Accordingly, it is also possible to selectively use the existing prediction method and the weighted prediction method according to the present invention. In order to selectively use the existing prediction method and the weighted prediction method, a flag bit for indicating whether to use the weighted prediction method may be inserted into the bit stream.

As illustrated in FIG. 10, if the weighted prediction use flag bit inserted into the bit stream is "1", the decoder uses the weighted prediction method, while if the bit is "0", the decoder uses the existing prediction method. In this case, it is sufficient that the weighted prediction use flag bit value is a value whereby the use and non-use of the weighted prediction method can be discriminated. The weighted prediction use flag bit may be inserted in the unit of a frame or a slice, or in the unit of a macroblock. On the other hand, the flag bit may be inserted into both a header of a frame or slice, and a header of a macroblock, and the prediction is performed by using a combination of the two bits. For example, if the flag value of the slice header is "0", the existing prediction method may be used with respect to all the frames, and if the flag value is "1", the weighted prediction method may be used with respect to all the frames. Also, if the flag value of the slice header is "2", the existing prediction method and the weighted prediction method may be selectively used according to the flag value of the macroblock.

On the other hand, the existing prediction method and the weighted prediction method may be selectively used by the YUV color components. In this case, the weighted prediction use flag may be composed of three bits, and the respective bits indicate whether to use the weighted prediction with respect to the respective components of a color space.

The concept of the video coding using the weighted prediction as described above can also be applied to a residual prediction. The residual prediction is a technique using that residual signals generated in two layers are similar to each other if motion vectors between the two layers are similar to each other in a multilayer structure. If it is assumed that the original signal of the present layer is O2, the predicted signal of the present layer is P2, the residual signal of the present layer is R2, the original signal of the base layer is O1, the predicted signal of the base layer is P1, and the residual signal of the base layer is R1, the residual signals of the respective layers are expressed as follows.

$$R2 = O2 - P2$$

$$R1 = O1 - P1$$

In this case, R1 is a signal quantized and coded in the base layer, and in the present layer, the compression efficiency is improved by quantizing R2−R1 instead of R2. This process can be adoptively used by determining whether to apply this process in the unit of a macroblock or a subblock.

In the case of a video coding using a weighted prediction, the residual value is obtained by subtracting the weighted prediction image from the original signal, instead of P1 and P2. Accordingly, the residual signals of the respective layers can be expressed as follows in Equation (8) and Equation (9).

$$R2 = O2 - P2 \qquad (8)$$

$$R1 = O1 - \beta P1 \qquad (9)$$

Here, α and β are weighted prediction factors of the blocks of the respective layers.

In this case, since the similarity between R1 and R2 is lowered, the performance of the residual prediction may deteriorate. Accordingly, a signal that is similar to R2, instead of R2 −R1, is generated using O1, P1, α, and β, and a value obtained by subtracting R2 from the signal is coded. That is, if the signal similar to R2 is R1', it can be expressed as follows in Equation (10).

$$R1' = O1 - \alpha P1 \qquad (10)$$

Then, Equation (11) is obtained by arranging Equation (9) for P1 and substituting the result of arrangement in Equation (10).

$$R1' = O1 - \alpha(O1 - R1)/\beta = (1 - \alpha/\beta)O1 + \alpha/\beta R1 \qquad (11)$$

That is, instead of coding R2−R1, R2−R1'=R2−((1−α/β)O+α/β R1) can be coded. In this case, the existing prediction method is used instead of the weighted prediction method if the weighted prediction factors of the respective layers are all "1".

Figure 11:
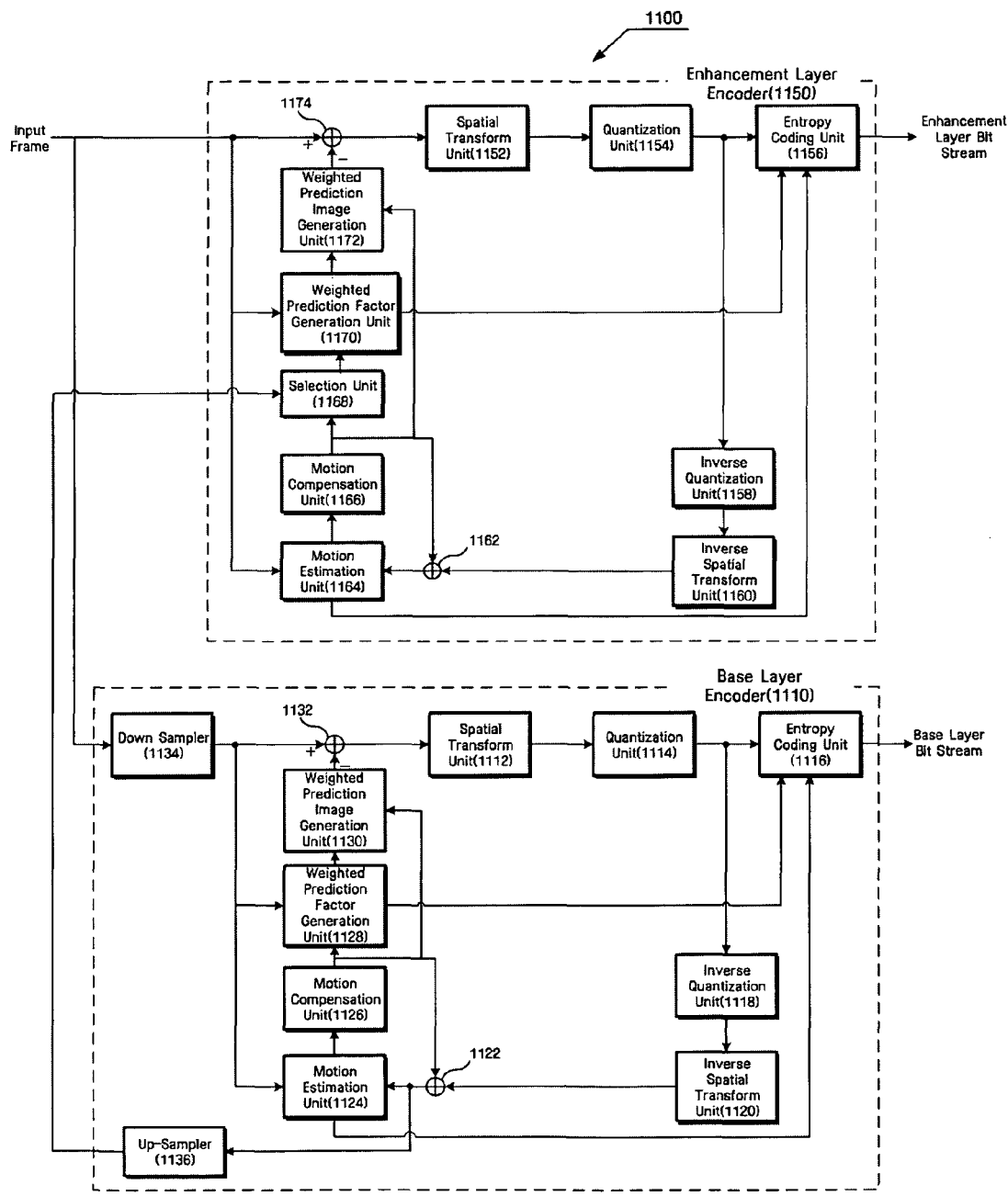
FIG. 11 is a block diagram illustrating the construction of an encoder according to an exemplary embodiment of the present invention.

FIG. 11 is a block diagram illustrating the construction of a video encoder according to an exemplary embodiment of the present invention.

Referring to FIG. 11, although the video encoder 1100 according to this exemplary embodiment of the present invention is constructed as a single layer encoder, it may also include a base layer encoder 1110 and an enhancement layer encoder 1150.

The enhancement layer encoder 1150 may include a spatial transform unit 1152, a quantization unit 1154, an entropy coding unit 1156, a motion estimation unit 1164, a motion compensation unit 1166, a selection unit 1168, a weighted prediction factor generation unit 1170, a weighted prediction image generation unit 1172, an inverse quantization unit 1158, and an inverse spatial transform unit 1160.

The selection unit 1168 selects a profitable prediction method among methods for base layer prediction, forward prediction, backward prediction, and bidirectional prediction. Although it may be preferable that such selection is performed in the unit of a macroblock, it may also be performed in the unit of a frame or a slice. For this, the selection unit 1168 receives a corresponding base layer frame from an up-sampler 1136 of the base layer encoder 1110, and receives a restored frame from an adder 1162.

The weighted prediction factor generation unit 1170 receives the original frame and a predicted frame from the selection unit, generates a weighted prediction factor according to Equation (5), and provides the generated weighted prediction factor to the weighted prediction image generation unit 1172 and the entropy coding unit 1156.

The weighted prediction image generation unit 1172 generates a weighted prediction image by multiplying the predicted image of the present block provided by the motion compensation unit 1166 by the weighted prediction factor transferred from the weighted prediction factor generation unit 1170.

The motion estimation unit 1164 performs a motion estimation of the present frame among input video frames by referring to a reference frame, and obtains motion vectors. The motion estimation unit 1164 sends motion data such as motion vectors obtained as the result of motion estimation, a motion block size, a reference frame number, and others, to the entropy coding unit 1156.

The motion compensation unit reduces temporal redundancy of the input video frame. In this case, the motion compensation unit 1166 generates a temporally predicted frame for the present frame by performing motion compensation for the reference frame using the motion vectors calculated in the motion estimation unit 1164.

A subtractor 1174 removes the temporal redundancy of a video by subtracting the temporally predicted frame from the present frame.

The spatial transform unit 1152 removes spatial redundancy from the frame from which the temporal redundancy has been removed by the subtractor 1174, using a spatial transform method that supports spatial scalability. The discrete cosine transform (DCT), the wavelet transform, or others, may be used as the spatial transform method.

The quantization unit 1154 quantizes transform coefficients obtained by the spatial transform unit 1152. Quantization means representing the transform coefficients, which are expressed as real values, as discrete values by dividing the transform coefficients into specified sections, and then matching the discrete values to specified indexes.

The entropy coding unit 1156 performs a lossless coding of the transform coefficients quantized by the quantization unit 1154, the motion data provided from the motion estimation unit 1164, and the weighted prediction factor provided from the weighted prediction factor generation unit 1170, and generates an output bit stream. Arithmetic coding or variable length coding may be used as the lossless coding method.

In the case where the video encoder 1100 supports a closed-loop video encoding in order to reduce a drifting error occurring between the encoder side and the decoder side, it may further include an inverse quantization unit 1158 and an inverse spatial transform unit 1160.

The inverse quantization unit 1158 performs inverse quantization on the coefficients quantized by the quantization unit 1154. This inverse quantization process corresponds to the inverse process of the quantization process.

The inverse spatial transform unit 1160 performs an inverse spatial transform on the results of the inverse quantization, and provides the results of the inverse spatial transform to the adder 1162.

The adder 1162 restores the video frame by adding the residual frame provided by the inverse spatial transform unit 1160 to the previous frame provided by the motion compensation unit 1166 and stored in a frame buffer (not illustrated), and provides the restored video frame to the motion estimation unit 1164 as the reference frame.

On the other hand, the base layer encoder 1110 may include a spatial transform unit 1112, a quantization unit 1114, an entropy coding unit 1116, a motion estimation unit 1124, a motion compensation unit 1126, a weighted prediction factor generation unit 1128, a weighted prediction image generation unit 1130, an inverse quantization unit 1118, an inverse spatial transform unit 1120, a down-sampler 1134, and an up-sampler 1136. Although in the exemplary embodiment of the present invention, the up-sampler 1136 is included in the base layer encoder 1110, it may exist at any place in the video encoder 1100.

The down-sampler 1134 down-samples the original input frame to the resolution of the base layer. This down-sampling is performed on the assumption that the resolution of the enhancement layer is different from the resolution of the base layer. If the resolutions of the two layers are the same, the down-sampling process can be omitted.

The up-sampler 1136 performs an up-sampling of the signal outputted from the adder 1122, i.e., the restored video frame, if needed, and provides the up-sampled video frame to the selection unit 1168 of the enhancement layer encoder 1150. Of course, if the resolution of the enhancement layer is the same as the resolution of the base layer, the up-sampling process can be omitted.

The operations of the spatial transform unit 1112, quantization unit 1114, entropy coding unit 1116, motion estimation unit 1164, motion compensation unit 1166, weighted prediction factor generation unit 1168, weighted prediction image generation unit 1170, inverse quantization unit 1118, and inverse spatial transform unit 1120 are the same as those existing in the enhancement layer, and therefore an explanation thereof is omitted.

Figure 12:
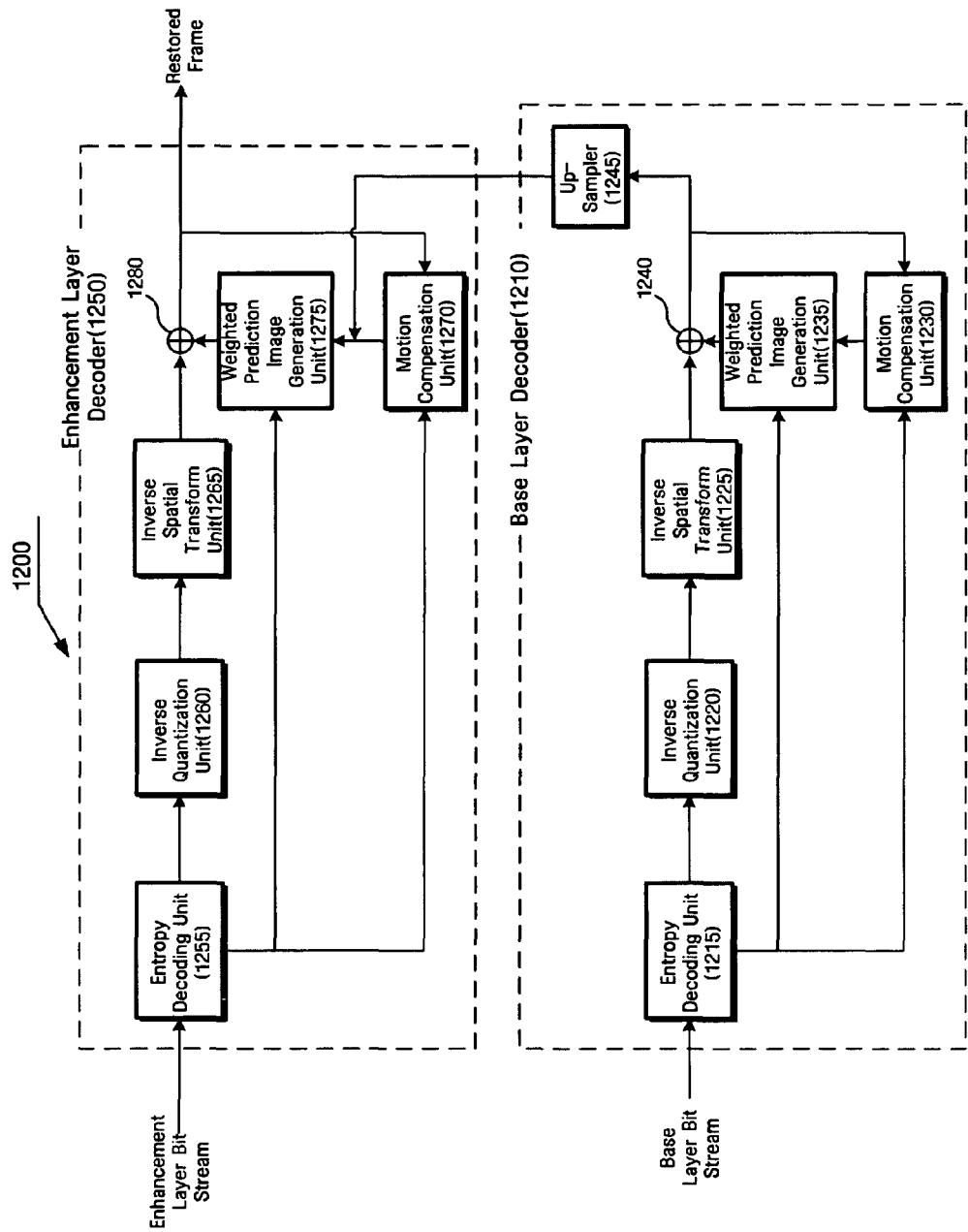
FIG. 12 is a block diagram illustrating the construction of a decoder that corresponds to the encoder of FIG. 11.

FIG. 12 is a block diagram illustrating the construction of a decoder that corresponds to the encoder of FIG. 11.

Referring to FIG. 12, although the video decoder 1200 according to this exemplary embodiment of the present invention may be constructed as a single layer decoder, it may also include a base layer decoder 1210 and an enhancement layer decoder 1250.

The enhancement layer decoder 1250 includes an entropy decoding unit 1255, an inverse quantization unit 1260, an inverse spatial transform unit 1265, a motion compensation unit 1270, and a weighted prediction image generation unit 1275.

The entropy decoding unit 1255 extracts a weighted prediction factor, motion data, and texture data by performing lossless decoding that is the inverse of the entropy encoding. The entropy decoding unit 1255 provides the extracted texture data to the inverse quantization unit 1260, the extracted motion data to the motion compensation unit 1270, and the weighted prediction factor to the weighted prediction image generation unit 1275.

The inverse quantization unit 1260 performs inverse quantization of the texture data transmitted from the entropy decoding unit 1255. This inverse quantization process is to search for quantized coefficients that match values expressed by specified indexes and transferred from the encoder side 1100. A table that represents mappings between indexes and quantization coefficients may be transferred from the encoder side 1100, or it may predetermined by the encoder and the decoder.

The inverse spatial transform unit 1265 performs the inverse spatial transform and restores the coefficients generated by the inverse quantization on the residual image in the spatial domain. For example, if the coefficients have been spatially transformed by a wavelet transform method in the video encoder side, the inverse spatial transform unit 1265 will perform an inverse wavelet transform, while if the coefficients have been transformed by a DCT transform method in the video encoder side, the inverse spatial transform unit 1265 will perform an inverse DCT transform.

The motion compensation unit 1270 performs motion compensation of the restored video frames and generates motion compensated frames using the motion data provided from the entropy decoding unit 1255. Of course, this motion compensation process can be performed only when the present frame is encoded through the temporal prediction process in the encoder side.

The weighted prediction image generation unit 1275 receives the weighted prediction factor from the entropy decoding unit 1255 and the restored prediction frame from the motion compensation unit 1270 or the base layer up-sampler 1245, respectively, and generates the weighted prediction image by multiplying the predicted frame by the weighted prediction factor.

An adder 1280 restores the video frames by adding the residual image to the motion compensated frames provided from the weighted prediction image generation unit 1275 when the residual image being restored by the inverse spatial transform unit is generated by the temporal prediction.

On the other hand, the base layer decoder 1210 may include an entropy decoding unit 1215, an inverse quantization unit 1220, an inverse spatial transform unit 1225, a motion compensation unit 1230, a weighted prediction image generation unit 1235, and an up-sampler 1245.

The up-sampler 1245 performs an up-sampling of the base layer image restored by the base layer decoder 1210 to the resolution of the enhancement layer. If the resolution of the base layer is the same as the resolution of the enhancement layer, the up-sampling process can be omitted.

The operations of the entropy decoding unit 1215, inverse quantization unit 1220, inverse spatial transform unit 1225, motion compensation unit 1230, and weighted prediction image generation unit 1235 are the same as those existing in the enhancement layer, and the duplicate explanation thereof will be omitted.

Figure 13:
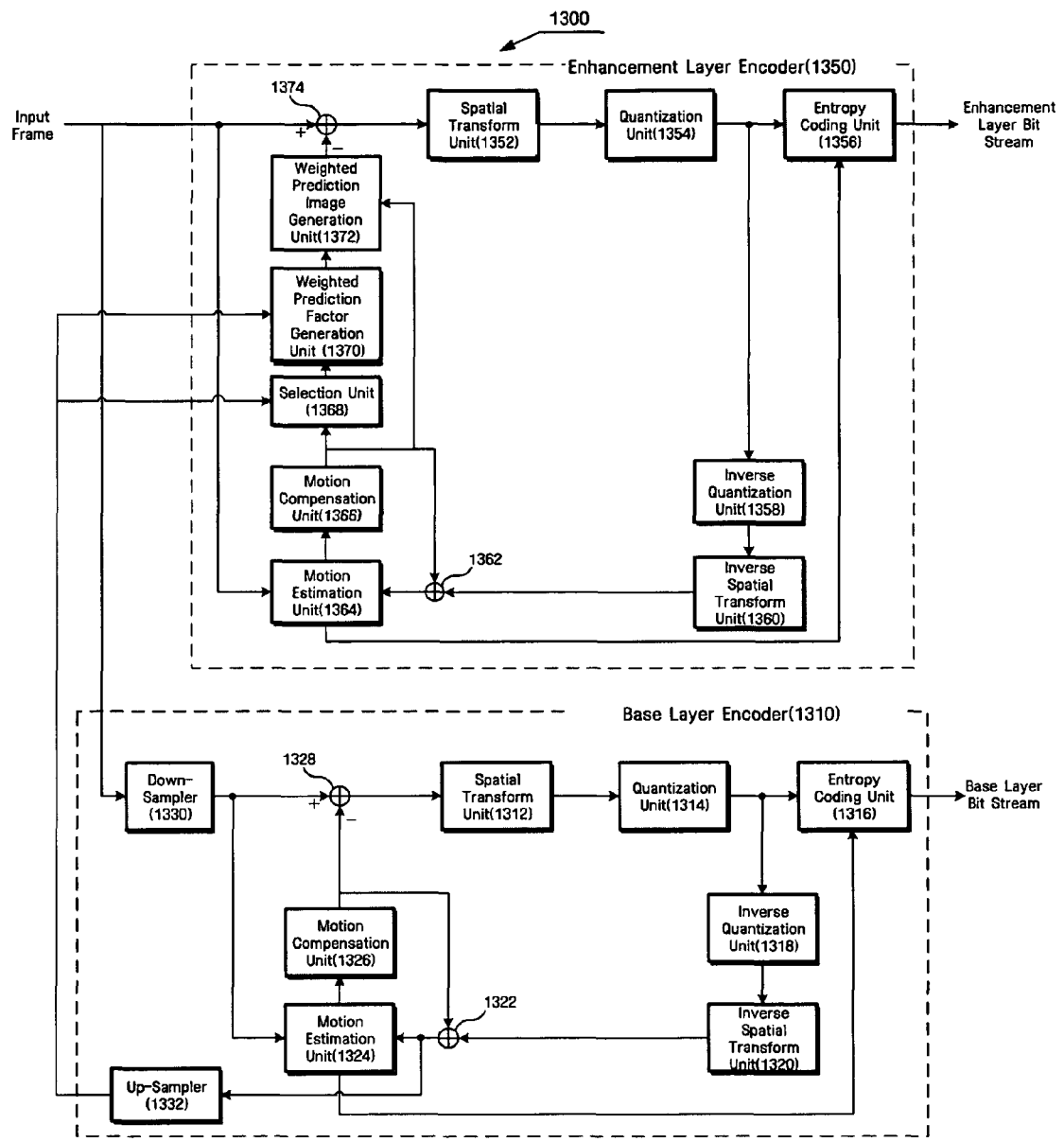
FIG. 13 is a block diagram illustrating the construction of an encoder according to another exemplary embodiment of the present invention.

FIG. 13 is a block diagram illustrating the construction of an encoder according to another exemplary embodiment of the present invention;

Referring to FIG. 13, the video encoder according to this exemplary embodiment of the present invention performs the coding method as illustrated in FIG. 5, and may include a base layer encoder 1310 and an enhancement layer encoder 1350.

The enhancement layer encoder 1350 may include a spatial transform unit 1352, a quantization unit 1354, an entropy coding unit 1356, a motion estimation unit 1364, a motion compensation unit 1366, a selection unit 1368, a weighted prediction factor generation unit 1370, a weighted prediction image generation unit 1372, an inverse quantization unit 1358, and an inverse spatial transform unit 1360.

The weighted prediction factor generation unit 1370 receives the predicted image of the present block from the selection unit 1368, and the base layer image corresponding to the present block from the up-sampler 1332 of the base layer encoder 1310, and calculates the weighted prediction factor α according to Equation (6). The weighted prediction image generation unit 1372 generates a weighted prediction image by multiplying the predicted image of the present block provided from the motion compensation unit 1366 by the weighted prediction factor transferred from the weighted prediction factor generation unit 1370.

On the other hand, the base layer encoder 1310 may include a spatial transform unit 1312, a quantization unit 1314, an entropy coding unit 1316, a motion estimation unit 1324, a motion compensation unit 1326, an inverse quantization unit 1318, an inverse spatial transform unit 1320, a down-sampler 1330, and an up-sampler 1332.

The up-sampler 1136 performs an up-sampling of the signal outputted from the adder 1322, i.e., the restored video frame, if needed, and provides the up-sampled video frame to the selection unit 1368 of the enhancement layer encoder 1350 and the weighted prediction factor generation unit 1370. Of course, if the resolution of the enhancement layer is the same as the resolution of the base layer, the up-sampling process can be omitted.

The operations of the spatial transform units 1312 and 1352, quantization units 1314 and 1354, the entropy coding units 1316 and 1356, the motion estimation units 1324 and 1364, the motion compensation units 1326 and 1366, the weighted prediction image generation unit 1170, the inverse quantization units 1318 and 1358, and the inverse spatial transform units 1320 and 1360 are the same as those existing in the encoder as illustrated in FIG. 11, and the duplicate explanation thereof will be omitted.

Figure 14:
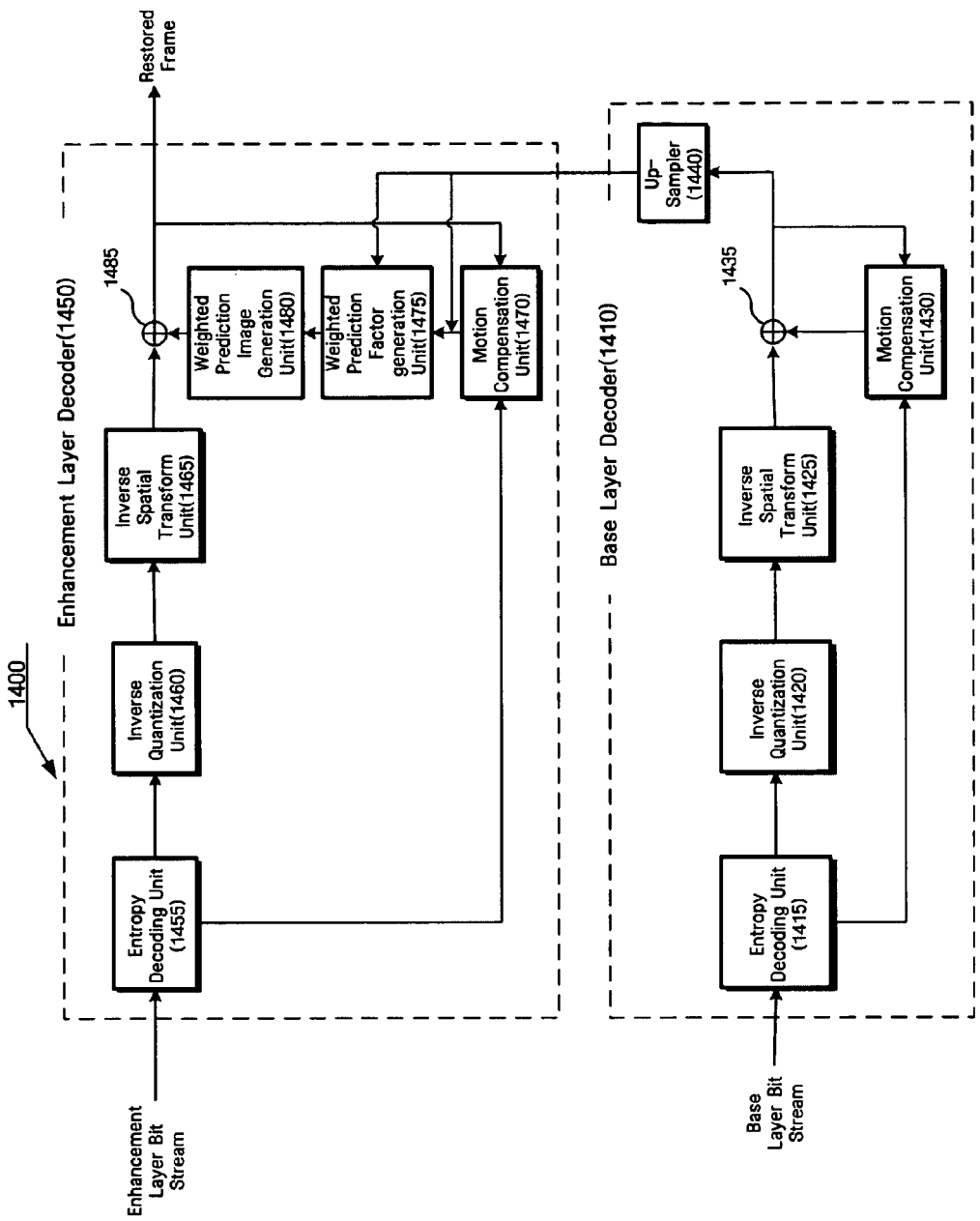
FIG. 14 is a block diagram illustrating the construction of a decoder that corresponds to the encoder of FIG. 13.

FIG. 14 is a block diagram illustrating the construction of a decoder that corresponds to the encoder of FIG. 13.

Referring to FIG. 14, the video decoder 1440 according to this exemplary embodiment of the present invention may include a base layer decoder 1410 and an enhancement layer decoder 1450.

The enhancement layer decoder 1450 includes an entropy decoding unit 1455, an inverse quantization unit 1460, an inverse spatial transform unit 1465, a motion compensation unit 1470, a weighted prediction factor generation unit 1475, and a weighted prediction image generation unit 1480.

The weighted prediction factor generation unit 1475 calculates the weighted prediction factor in the same manner as the weighted prediction factor generation unit 1370 of the encoder as illustrated in FIG. 13. That is, the weighted prediction factor generation unit 1475 receives the restored prediction image from the motion compensation unit 1470, and the base layer image corresponding to the present block from the up-sampler 1440 of the base layer decoder 1410, and calculates the weighted prediction factor α according to Equation (6). The weighted prediction image generation unit 1480 generates a weighted prediction image by multiplying the predicted image of the present block provided from the motion compensation unit 1470 through the weighted prediction factor generation unit 1475 by the weighted prediction factor transferred from the weighted prediction factor generation unit 1475.

An adder 1485 restores the video frames by adding the residual image to the weighted prediction image provided by the weighted prediction image generation unit 1480 when the residual image restored by the inverse spatial transform unit 1465 is generated by the temporal prediction.

On the other hand, the base layer decoder 1410 may include an entropy decoding unit 1415, an inverse quantization unit 1420, an inverse spatial transform unit 1425, a motion compensation unit 1430, and an up-sampler 1440.

The operations of the entropy decoding units 1415 and 1455, inverse quantization units 1420 and 1460, inverse spatial transform units 1425 and 1465, motion compensation units 1430 and 1470, and up-sampler 1440 are the same as those existing in the video decoder as illustrated in FIG. 12, and the duplicate explanation thereof will be omitted.

Figure 15:
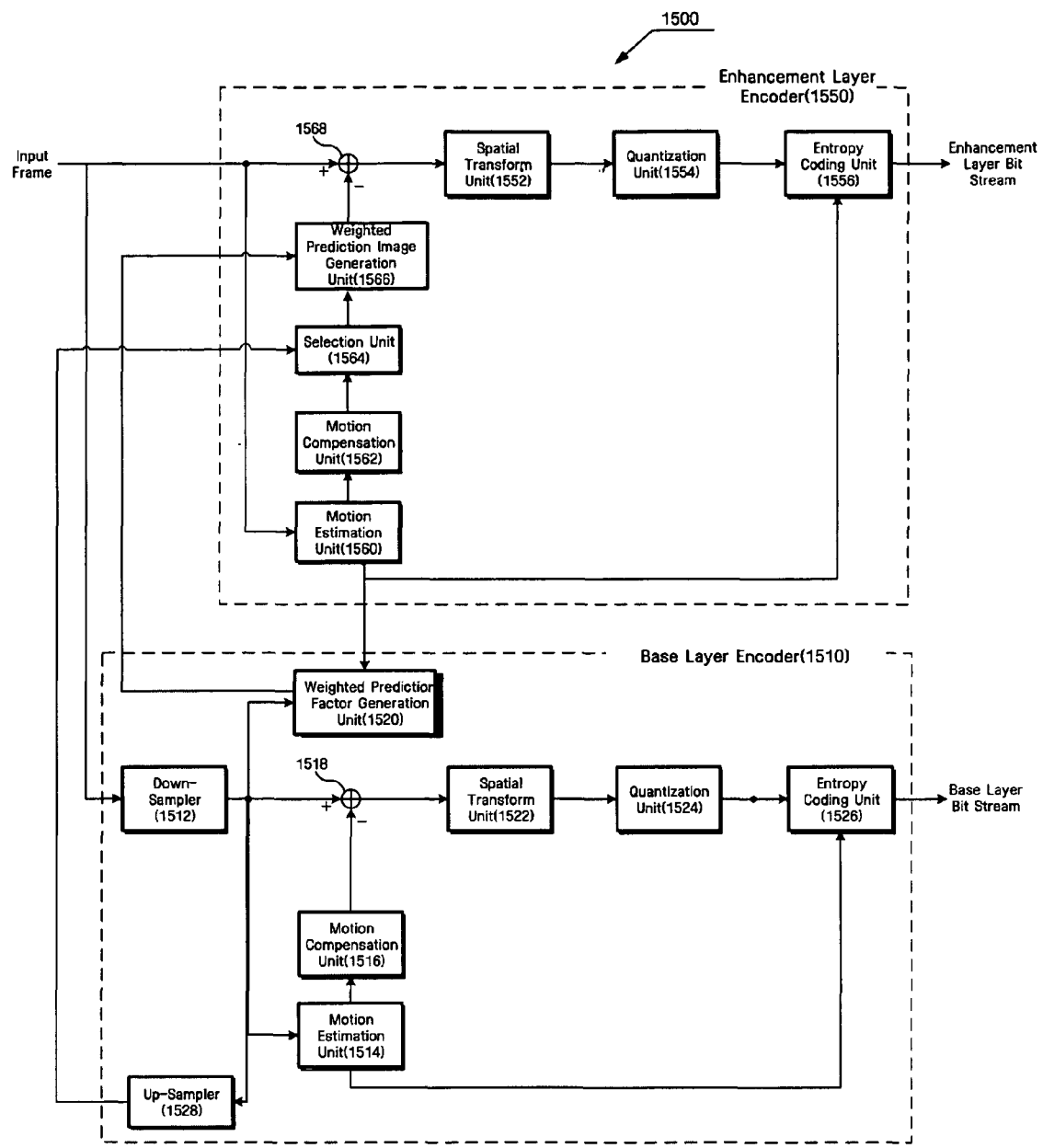
FIG. 15 is a block diagram illustrating the construction of a video encoder using a weighted prediction according to still another exemplary embodiment of the present invention.

FIG. 15 is a block diagram illustrating the construction of a video encoder using a weighted prediction according to still another exemplary embodiment of the present invention.

Referring to FIG. 15, the video encoder 1500 according to this exemplary embodiment of the present invention performs the coding method as illustrated in FIG. 6. The video encoder 1500 briefly includes a base layer encoder 1510 and an enhancement layer encoder 1550.

The enhancement layer encoder 1550 may include a spatial transform unit 1552, a quantization unit 1554, an entropy coding unit 1556, a motion estimation unit 1560, a motion compensation unit 1562, a selection unit 1564, and a weighted prediction image generation unit 1566.

The weighted prediction image generation unit 1566 generates the weighted prediction image by multiplying the predicted image of the present block provided from the selection unit 1564 by the weighted prediction factor transferred from the weighted prediction factor generation unit 1520 of the base layer encoder 1510.

On the other hand, the base layer encoder 1510 may include a spatial transform unit 1522, a quantization unit 1524, an entropy coding unit 1526, a motion estimation unit 1514, a motion compensation unit 1516, a weighted prediction factor generation unit 1520, a down-sampler 1512, and an up-sampler 1528. Although in the exemplary embodiment of the present invention, the weighted prediction factor generation unit 1520 and the up-sampler 1528 are included in the base layer encoder 1510, they may exist anywhere in the video encoder 1500.

The weighted prediction factor generation unit 1520 receives motion vectors from the motion estimation unit 1560 of the enhancement layer encoder 1550, searches for the base layer reference image from the base layer frame provided from the down-sampler 1512, and generates the base layer prediction image using the base layer reference image in the same manner as the predicted image generated in the enhancement layer. The weighted prediction factor generation unit 1520 calculates the weighted prediction factor α according to Equation (7) using the base layer image and the base layer prediction image, and provides the weighted prediction factor α to the weighted prediction image generation unit 1566 of the enhancement layer encoder 1550.

The operations of the spatial transform units 1522 and 1552, quantization units 1524 and 1554, entropy coding units 1526 and 1556, motion estimation units 1514 and 1560, motion compensation units 1516 and 1562, selection unit 1564, down-sampler 1512, and up-sampler 1528 are the same as those of the encoder illustrated in FIG. 11, and therefore an explanation thereof is omitted.

Figure 16:
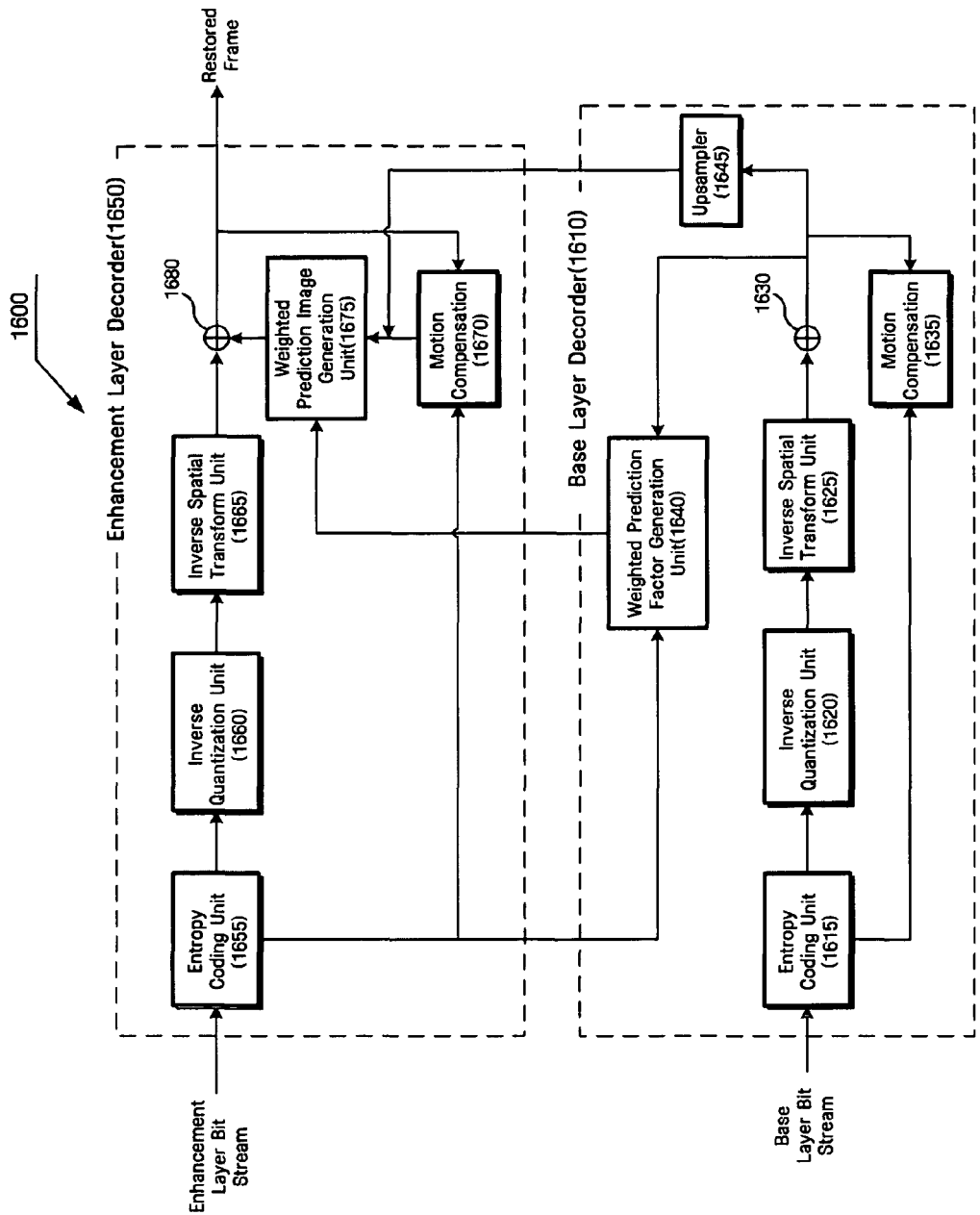
FIG. 16 is a block diagram illustrating the construction of a decoder that corresponds to the encoder of FIG. 15.

FIG. 16 is a block diagram illustrating the construction of a decoder that corresponds to the encoder of FIG. 15.

Referring to FIG. 16, the video decoder 1600 according to this exemplary embodiment of the present invention may include a base layer decoder 1610 and an enhancement layer decoder 1650.

The enhancement layer decoder 1650 includes an entropy decoding unit 1655, an inverse quantization unit 1660, an inverse spatial transform unit 1665, a motion compensation unit 1670, and a weighted prediction image generation unit 1675.

The weighted prediction image generation unit 1675 generates the weighted prediction image by multiplying the restored prediction image of the present block provided from the motion compensation unit 1670 by the weighted prediction factor transferred from the weighted prediction factor generation unit 1640 of the base layer decoder 1610.

An adder 1680 restores the video frames by adding the residual image to the weighted prediction image provided from the weighted prediction image generation unit 1675 when the residual image being restored by the inverse spatial transform unit is generated by the temporal prediction.

On the other hand, the base layer decoder 1610 may include an entropy decoding unit 1615, an inverse quantization unit 1620, an inverse spatial transform unit 1625, a motion compensation unit 1635, a weighted prediction factor generation unit 1640, and an up-sampler 1645.

The weighted prediction factor generation unit 1640 calculates the weighted prediction factor in the same manner as the weighted prediction factor generation unit 1520 of the encoder as illustrated in FIG. 15. That is, the weighted prediction factor generation unit receives motion vectors from the entropy decoding unit 1655 of the enhancement layer decoder 1650, searches for the base layer reference image from the restored base layer frame provided from the adder 1630, and generates the base layer prediction image using the base layer reference image in the same manner as the predicted image generated in the enhancement layer. The weighted prediction factor generation unit 1640 calculates the weighted prediction factor α according to Equation (7) using the base layer image and the base layer prediction image, and provides the calculated weighted prediction factor α to the weighted prediction image generation unit 1675 of the enhancement layer encoder 1650.

The operations of the entropy decoding units 1615 and 1655, inverse quantization units 1620 and 1660, inverse spatial transform units 1625 and 1665, motion compensation units 1635 and 1670, and up-sampler 1645 are the same as those existing in the video decoder as illustrated in FIG. 12, and therefore explanations thereof are omitted.

Although it is exemplified that a plurality of constituent elements having the same names but with different identification numbers exist in FIGS. 11 to 16, it will be apparent to those skilled in the art that a single constituent element can operate in both the base layer and the enhancement layer.

The respective constituent elements as illustrated in FIGS. 11 to 16 may be embodied as software or hardware such as a field-programmable gate array (FPGA) and an application-specific integrated circuit (ASIC). Further, the constituent elements may be constructed so as to reside in an addressable storage medium, or to execute one or more processors. The functions provided in the constituent elements may be implemented by subdivided constituent elements, and the constituent elements and functions provided in the constituent elements may be combined to perform a specified function. In addition, the constituent elements may be implemented so as to execute one or more computers in a system.

As described above, the video coding and decoding method according to the present invention may produce at least one of the following effects.

First, the efficiency of the video coding can be heightened by reducing the error between the present block to be compressed and the predicted image.

Second, the efficiency of the video coding can be heightened by using information of the base layer when generating the predicted image.

The exemplary embodiments of the present invention have been described for illustrative purposes, and those skilled in the art will appreciate that various modifications, additions and substitutions are possible without departing from the scope and spirit of the invention as disclosed in the accompanying claims.

What is claimed is:

1. A video coding method comprising:
generating a predicted image for a present block;
generating a weighted prediction factor for scaling the predicted image;
generating a weighted prediction image by multiplying the predicted image by the weighted prediction factor;
generating a residual signal by subtracting the weighted prediction image from the present block; and
coding the residual signal,
wherein the generating the weighted prediction factor comprises:
generating a base layer prediction image, which corresponds to the predicted image of the present block, from a base layer forward adjacent frame or a base layer backward adjacent frame of a base layer image that corresponds to the present block by using motion vectors of the present block; and
extracting the weighted prediction factor whereby a difference between the base layer image corresponding to the present block and the predicted image is minimized.

2. The video coding method as claimed in claim 1, wherein the generating the weighted prediction factor comprises minimizing a mean squared error of values, which are obtained by multiplying pixel values of the present block by pixel values of the predicted image.

3. The video coding method as claimed in claim 1, wherein the weighted prediction factor is extracted according to the equation:

$$\frac{\sum z(i,j)y(i,j)}{\sum y(i,j)^2},$$

where y(i, j) denotes pixel values of the predicted image, and z(i, j) denotes pixel values of the base layer image.

4. The video coding method as claimed in claim 1, wherein the weighted prediction factor is extracted according to the equation:

$$\frac{\sum z(i,j)u(i,j)}{\sum u(i,j)^2},$$

where z(i, j) denotes pixel values of the base layer image, and u(i, j) denotes pixel values of the base layer prediction image.

5. The video coding method as claimed in claim 1, wherein the coding the residual signal comprises encoding a difference between the residual signal of the present block and a value that is obtained by subtracting a value, which is obtained by multiplying a predicted image of a base layer image by the weighted prediction factor, from the base layer image corresponding to the present block.

6. A video coding method comprising:
generating a predicted image for a present block;
generating a weighted prediction factor for scaling the predicted image;
generating a weighted prediction image by multiplying the predicted image by the weighted prediction factor;
selecting an image between the predicted image and the weighted prediction image that raises a compression performance of the present block;
generating a residual signal by subtracting the selected image from the present block;
coding the residual image; and
inserting information that indicates whether to use a weighted prediction into the present block according to a result of the selecting.

7. The video coding method as claimed in claim 6, wherein the selecting the image that raises the compression performance of the present block comprises selecting an image between the predicted image and the weighted prediction image that has a smaller rate distortion.

8. The video coding method as claimed in claim 6, wherein the information that indicates whether to use the weighted prediction is inserted into at least one of a header of a slice or a header of a macroblock.

9. The video coding method as claimed in claim 6, wherein the information that indicates whether to use the weighted prediction indicates whether to use the weighted prediction for each of a luminance component and chrominance components.

10. A video decoding method comprising:
restoring a predicted image of a present block to be restored from a bit stream;
restoring a residual signal of the present block from the bit stream;
generating a weighted predication image by multiplying the predicted image by a weighted prediction factor; and
restoring the present block by adding the residual signal to the weighted prediction image,
wherein the generating the weighted prediction image comprises:
generating a base layer prediction image, which corresponds to the predicted image of the present block, from a base layer forward adjacent frame or a base layer backward adjacent frame of a base layer image that corresponds to the present block by using motion vectors of the present block;
generating the weighted prediction factor whereby a difference between the base layer image corresponding to the present block and the base layer prediction image is minimized; and
generating the weighted prediction image by multiplying the predicted image by the generated weighted prediction factor.

11. The video decoding method as claimed in claim 10, wherein the generating the weighted prediction image comprises:

extracting the weighted prediction factor from the bit stream; and generating the weighted prediction image by multiplying the predicted image by the extracted weighted prediction factor.

12. The video decoding method as claimed in claim 10, wherein the generating the weighted prediction image comprises:

generating the weighted prediction factor whereby a difference between a base layer image corresponding to the present block and the predicted image is minimized; and generating the weighted prediction image by multiplying the predicted image by the generated weighted prediction factor.

13. A video decoding method comprising:

restoring a predicted image of a present block to be restored from a bit stream;

restoring a residual signal of the present block from the bit stream;

generating a weighted predication image by multiplying the predicted image by a weighted prediction factor; and restoring the present block by adding the residual signal to the weighted prediction image wherein the generating the weighted prediction image comprises:

generating the weighted prediction factor whereby a difference between a base layer image corresponding to the present block and the predicted image is minimized; and generating the weighted prediction image by multiplying the predicted image by the generated weighted prediction factor, wherein the weighted prediction factor is extracted according to the equation:

$$\frac{\sum z(i, j)y(i, j)}{\sum y(i, j)^2},$$

where y(i, j) denotes pixel values of the predicted image, and z(i, j) denotes pixel values of the base layer image.

14. The video decoding method as claimed in claim 10, wherein the generating the weighted prediction factor comprises extracting the weighted prediction factor according to the equation:

$$\frac{\sum z(i, j)u(i, j)}{\sum u(i, j)^2},$$

where z(i, j) denotes pixel values of the base layer image, and u(i, j) denotes pixel values of the base layer prediction image.

15. The video decoding method as claimed in claim 10, wherein the restoring the residual signal comprises adding a value that is obtained by subtracting a value, which is obtained by multiplying a predicted image of a base layer image by the weighted prediction factor, from the base layer image corresponding to the present block to the residual signal of the present block.

16. A video encoder comprising:

means for generating a predicted image for a present block;

means for generating a weighted prediction factor for scaling the predicted image;

means for generating a weighted prediction image by multiplying the predicted image by the weighted prediction factor;

means for generating a residual signal by subtracting the weighted prediction image from the present block; and means for coding the residual signal, wherein the means for generating the weighted prediction factor comprises:

means for generating a base layer prediction image, which corresponds to the predicted image of the present block, from a base layer forward adjacent frame or a base layer backward adjacent frame of a base layer image that corresponds to the present block by using motion vectors of the present block; and means for extracting the weighted prediction factor whereby a difference between the base layer image corresponding to the present block and the predicted image is minimized.

17. A video encoder comprising:

means for generating a predicted image for a present block;

means for generating a weighted prediction factor for scaling the predicted image;

means for generating a weighted prediction image by multiplying the predicted image by the weighted prediction factor;

means for generating a residual signal by subtracting the weighted prediction image from the present block; and means for coding the residual signal, wherein the means for generating the weighted prediction factor minimizes a mean squared error of values, which are obtained by multiplying pixel values of the present block by pixel values of the predicted image.

18. The video encoder as claimed in claim 16, wherein the means for generating the weighted prediction factor extracts the weighted prediction factor whereby the difference between a base layer image corresponding to the present block and the predicted image is minimized.

19. The video encoder as claimed in claim 16, wherein the means for coding the residual signal encodes a difference between the residual signal of the present block and a value that is obtained by subtracting a value, which is obtained by multiplying a predicted image of a base layer image by the weighted prediction factor, from the base layer image corresponding to the present block.

20. A video encoder comprising:

means for generating a predicted image for a present block;

means for generating a weighted prediction factor for scaling the predicted image;

means for generating a weighted prediction image by multiplying the predicted image by the weighted prediction factor;

means for selecting an image that raises a compression performance of the present block between the predicted image and the weighted prediction image;

means for generating a residual signal by subtracting the selected image from the present block;

means for coding the residual image; and means for inserting information that indicates whether to use a weighted prediction into the present block according to a result of selection.

21. The video encoder as claimed in claim 20, wherein the means for selecting an image that raises the compression performance of the present block selects an image between the predicted image and the weighted prediction image that has a smaller rate distortion.

22. The video encoder as claimed in claim 20, wherein the information that indicates whether to use the weighted prediction is inserted into at least one of a header of a slice or a header of a macroblock.

23. The video encoder as claimed in claim 20, wherein the information that indicates whether to use the weighted prediction indicates whether to use the weighted prediction for each of a luminance component and chrominance components.

24. A video decoder comprising:
means for restoring a predicted image of a present block to be restored from a bit stream;
means for restoring a residual signal of the present block from the bit stream;
means for generating a weighted prediction image by multiplying the predicted image by a weighted prediction factor; and
means for restoring the present block by adding the residual signal to the weighted prediction image,
wherein the means for generating the weighted prediction image comprises:
means for generating a base layer prediction image, which corresponds to the predicted image of the present block, from a base layer forward adjacent frame or a base layer backward adjacent frame of a base layer image that corresponds to the present block by using motion vectors of the present block;
means for generating the weighted prediction factor whereby a difference between the base layer image corresponding to the present block and the base layer prediction image is minimized; and
means for generating the weighted prediction image by multiplying the predicted image by the generated weighted prediction factor.

25. The video decoder as claimed in claim 24, wherein the means for generating the weighted prediction image comprises:
means for extracting the weighted prediction factor from the bit stream; and
means for generating the weighted prediction image by multiplying the predicted image by the extracted weighted prediction factor.

26. The video decoder as claimed in claim 24, wherein the means for generating the weighted prediction image comprises:
means for generating the weighted prediction factor whereby the difference between a base layer image corresponding to the present block and the predicted image is minimized; and
means for generating the weighted prediction image by multiplying the predicted image by the generated weighted prediction factor.

27. The video decoder as claimed in claim 24, wherein the means for restoring the residual signal adds a value that is obtained by subtracting a value, which is obtained by multiplying a predicted image of a base layer image by the weighted prediction factor, from the base layer image corresponding to the present block to the residual signal of the present block.

28. A recording medium recorded with a computer-readable program for executing a video coding method comprising:
generating a predicted image for a present block;
generating a weighted prediction factor for scaling the predicted image;
generating a weighted prediction image by multiplying the predicted image by the weighted prediction factor;
generating a residual signal by subtracting the weighted prediction image from the present block; and
coding the residual signal,
wherein the generating the weighted prediction factor comprises:
generating a base layer prediction image, which corresponds to the predicted image of the present block, from a base layer forward adjacent frame or a base layer backward adjacent frame of a base layer image that corresponds to the present block by using motion vectors of the present block; and
extracting the weighted prediction factor whereby a difference between the base layer image corresponding to the present block and the predicted image is minimized.

29. A recording medium recorded with a computer-readable program for executing a video coding method comprising:
generating a predicted image for a present block;
generating a weighted prediction factor for scaling the predicted image;
generating a weighted prediction image by multiplying the predicted image by the weighted prediction factor;
selecting an image between the predicted image and the weighted prediction image that raises a compression performance of the present block;
generating a residual signal by subtracting the selected image from the present block;
coding the residual image; and
inserting information that indicates whether to use a weighted prediction into the present block according to a result of the selecting.

30. A recording medium recorded with a computer-readable program for executing a video decoding method comprising:
restoring a predicted image of a present block to be restored from a bit stream;
restoring a residual signal of the present block from the bit stream;
generating a weighted predication image by multiplying the predicted image by a weighted prediction factor; and
restoring the present block by adding the residual signal to the weighted prediction image,
wherein the generating the weighted prediction image comprises:
generating a base layer prediction image, which corresponds to the predicted image of the present block, from a base layer forward adjacent frame or a base layer backward adjacent frame of a base layer image that corresponds to the present block by using motion vectors of the present block;
generating the weighted prediction factor whereby a difference between the base layer image corresponding to the present block and the base layer prediction image is minimized; and
generating the weighted prediction image by multiplying the predicted image by the generated weighted prediction factor.

31. A video decoding method comprising:
receiving a bitstream of an encoded video signal; and
decoding the encoded video signal,
wherein the bitstream comprises:
a first region that contains information used to generate a reference block in order to restore a present block in an enhancement layer; and
a second region that contains information indicating whether a weighted prediction factor to be applied to the reference block is generated using information on a base layer which corresponds to the enhancement layer, wherein the weighted prediction factor is generated using information on the enhancement layer if the weighted prediction factor applied to the reference block is not generated using the information on the base layer corresponding to the enhancement layer.

32. The video decoding method of claim 31, wherein the information indicating whether the weighted prediction factor applied to the reference block is generated using information on the base layer includes a flag bit inserted into a frame header or slice header.

33. The video decoding method of claim 31, wherein the weighted prediction factor is a scaling factor that minimizes a difference between the present block and a predicted image which is generated from the reference block.

34. The video decoding method of claim 31, wherein the information on the base layer includes a base layer frame in the same temporal location as an enhancement layer frame that includes the present block.

35. The method of claim 31, wherein decoding the encoded video signal comprises parsing the bitstream to determine a value of the flag bit, wherein the weighted prediction factor to be applied to the reference block is generated using information on the base layer if the flag bit is a first value, and the weighted prediction factor to be applied to the reference block is generated using information on the enhancement layer if the flag bit is a second value.

36. A video decoding method comprising:

receiving an encoded video signal having base layer and an enhancement layer; and generating a reference block in order to restore a present block in the enhancement layer; and determining whether a weighted prediction factor to be applied to the reference block is generated using information on the base layer which corresponds to the enhancement layer, wherein the weighted prediction factor is generated using information on the enhancement layer if the weighted prediction factor applied to the reference block is not generated using the information on the base layer corresponding to the enhancement layer.

37. The video decoding method of claim 36, wherein the information indicating whether the weighted prediction factor applied to the reference block is generated using information on the base layer includes a flag bit inserted into a frame header or slice header.

38. The video decoding method of claim 36, wherein the weighted prediction factor is a scaling factor that minimizes a difference between the present block and a predicted image which is generated from the reference block.

39. The video decoding method of claim 36, wherein the information on the base layer includes a base layer frame in the same temporal location as an enhancement layer frame that includes the present block.

40. The video decoding method of claim 36, wherein decoding the encoded video signal comprises parsing the bitstream to determine a value of the flag bit, wherein the weighted prediction factor to be applied to the reference block is generated using information on the base layer if the flag bit is a first value, and the weighted prediction factor to be applied to the reference block is generated using information on the enhancement layer if the flag bit is a second value.

41. A video decoding apparatus comprising:

means for receiving an encoded video signal having base layer and an enhancement layer; and means for generating a reference block in order to restore a present block in the enhancement layer; and means for determining whether a weighted prediction factor to be applied to the reference block is generated using information on the base layer which corresponds to the enhancement layer, wherein the weighted prediction factor is generated using information on the enhancement layer if the weighted prediction factor applied to the reference block is not generated using the information on the base layer corresponding to the enhancement layer.

42. The video decoding apparatus of claim 41, wherein the information indicating whether the weighted prediction factor applied to the reference block is generated using information on the base layer includes a flag bit inserted into a frame header or slice header.

43. The video decoding apparatus of claim 41, wherein the weighted prediction factor is a scaling factor that minimizes a difference between the present block and a predicted image which is generated from the reference block.

44. The video decoding apparatus of claim 41, wherein the information on the base layer includes a base layer frame in the same temporal location as an enhancement layer frame that includes the present block.

45. The video decoding apparatus of claim 41, wherein decoding the encoded video signal comprises parsing the bitstream to determine a value of the flag bit, wherein the weighted prediction factor to be applied to the reference block is generated using information on the base layer if the flag bit is a first value, and the weighted prediction factor to be applied to the reference block is generated using information on the enhancement layer if the flag bit is a second value.

* * * * *